United States Patent
Abrams

(10) Patent No.: US 9,180,728 B2
(45) Date of Patent: *Nov. 10, 2015

(54) DIMENSIONAL, PATTERNED HEAT APPLIED APPLIQUE OR TRANSFER MADE FROM KNIT TEXTILE

(75) Inventor: Louis Brown Abrams, Fort Collins, CO (US)

(73) Assignee: High Voltage Graphics, Inc., Fort Collins, CO (US)

( * ) Notice: Subject to any disclaimer, the term of this patent is extended or adjusted under 35 U.S.C. 154(b) by 919 days.

This patent is subject to a terminal disclaimer.

(21) Appl. No.: 13/164,530

(22) Filed: Jun. 20, 2011

(65) Prior Publication Data

US 2012/0028003 A1 Feb. 2, 2012

Related U.S. Application Data

(60) Provisional application No. 61/356,425, filed on Jun. 18, 2010, provisional application No. 61/358,679, filed on Jun. 25, 2010, provisional application No. 61/364,312, filed on Jul. 14, 2010, provisional (Continued)

(51) Int. Cl.
| | | |
|---|---|---|
| *B32B 7/02* | (2006.01) | |
| *B32B 7/12* | (2006.01) | |
| *B44C 1/10* | (2006.01) | |
| *B44C 1/17* | (2006.01) | |
| *A41D 27/08* | (2006.01) | |
| *B32B 5/02* | (2006.01) | |

(Continued)

(52) U.S. Cl.
CPC .............. *B44C 1/1712* (2013.01); *A41D 27/08* (2013.01); *B32B 5/026* (2013.01); *B32B 7/12* (2013.01); *B44C 1/105* (2013.01); *D06Q 1/12* (2013.01); *B32B 25/08* (2013.01); *B32B 27/08* (2013.01); *B32B 27/12* (2013.01); *B32B 2262/0207* (2013.01); *B32B 2262/0215* (2013.01); *B32B 2274/00* (2013.01); *B32B 2307/50* (2013.01); *B32B 2307/54* (2013.01);

(Continued)

(58) Field of Classification Search
CPC ...... B44C 1/165; B44C 1/1712; B44C 1/105; B32B 5/026; B32B 7/12; B32B 2405/00; B32B 2307/51; Y10T 428/24802; Y10T 428/24818
USPC ......... 428/196, 197, 212, 213, 214, 343, 346, 428/354, 215, 195.1
See application file for complete search history.

(56) References Cited

U.S. PATENT DOCUMENTS

| | | |
|---|---|---|
| 3,660,200 A | 5/1972 | Anderson et al. |
| 4,088,708 A | 5/1978 | Riew |

(Continued)

FOREIGN PATENT DOCUMENTS

| | | |
|---|---|---|
| JP | 11-042749 | 2/1999 |
| JP | 2001-226885 | 8/2001 |
| WO | WO 90/09289 | 8/1990 |

OTHER PUBLICATIONS

"3914 Data Sheet." Bemis, Aug. 20, 2009, 2 pages.

(Continued)

*Primary Examiner* — Cheryl Juska
(74) *Attorney, Agent, or Firm* — Sheridan Ross P.C.

(57) ABSTRACT

A stretchable knit appliqué is described. The appliqué is configured by a knitted textile material adhered to an elastomeric film by a first adhesive continuously distributed over elastomeric film. Moreover, the appliqué is configured to stretch with the elastomeric film. The appliqué can have a first and second knitted materials, with a printed design in registration with the first and second textile materials. The printed design can be a sublimation printed design.

19 Claims, 22 Drawing Sheets

Related U.S. Application Data application No. 61/373,738, filed on Aug. 13, 2010, provisional application No. 61/377,790, filed on Aug. 27, 2010, provisional application No. 61/378,751, filed on Aug. 31, 2010, provisional application No. 61/380,892, filed on Sep. 8, 2010, provisional application No. 61/381,360, filed on Sep. 9, 2010, provisional application No. 61/385,760, filed on Sep. 23, 2010, provisional application No. 61/389,544, filed on Oct. 4, 2010, provisional application No. 61/392,837, filed on Oct. 13, 2010, provisional application No. 61/405,558, filed on Oct. 21, 2010, provisional application No. 61/422,979, filed on Dec. 14, 2010, provisional application No. 61/429,623, filed on Jan. 4, 2011, provisional application No. 61/466,837, filed on Mar. 23, 2011, provisional application No. 61/467,656, filed on Mar. 25, 2011, provisional application No. 61/469,976, filed on Mar. 31, 2011, provisional application No. 61/477,977, filed on Apr. 21, 2011, provisional application No. 61/478,387, filed on Apr. 22, 2011, provisional application No. 61/478,822, filed on Apr. 25, 2011, provisional application No. 61/481,477, filed on May 2, 2011.

(51) Int. Cl.
| | | |
|---|---|---|
| *D06Q 1/12* | (2006.01) | |
| *B32B 25/08* | (2006.01) | |
| *B32B 27/08* | (2006.01) | |
| *B32B 27/12* | (2006.01) | |
| *D06P 5/28* | (2006.01) | |
| *D06Q 1/00* | (2006.01) | |

(52) U.S. Cl.
CPC ............ *B32B 2405/00* (2013.01); *D06P 5/004* (2013.01); *D06Q 1/00* (2013.01); *Y10T 428/2481* (2015.01); *Y10T 428/24802* (2015.01)

(56) References Cited

U.S. PATENT DOCUMENTS

| | | | |
|---|---|---|---|
| 4,810,549 A | | 3/1989 | Abrams et al. |
| 4,931,125 A | | 6/1990 | Volkmann et al. |
| 5,047,103 A | | 9/1991 | Abrams et al. |
| 5,207,851 A | | 5/1993 | Abrams |
| 5,346,746 A | | 9/1994 | Abrams |
| 5,411,783 A | * | 5/1995 | Mahn, Jr. ................. 428/79 |
| 5,597,633 A | | 1/1997 | Mecke et al. |
| 5,597,637 A | | 1/1997 | Abrams et al. |
| 5,658,630 A | | 8/1997 | Shizukuda et al. |
| 5,665,458 A | * | 9/1997 | Mahn, Jr. ................. 428/202 |
| 5,858,156 A | | 1/1999 | Abrams et al. |
| 6,010,764 A | | 1/2000 | Abrams |
| 6,083,332 A | | 7/2000 | Abrams |
| 6,110,560 A | | 8/2000 | Abrams |
| 6,660,352 B2 | | 12/2003 | Hsu et al. |
| 6,929,771 B1 | | 8/2005 | Abrams |
| 6,977,023 B2 | | 12/2005 | Abrams |
| 7,135,518 B2 | | 11/2006 | Bandou et al. |
| 7,191,720 B2 | | 3/2007 | Thomas |
| 7,338,697 B2 | | 3/2008 | Abrams |
| 7,344,769 B1 | | 3/2008 | Abrams |
| 7,351,368 B2 | | 4/2008 | Abrams |
| 7,364,782 B2 | | 4/2008 | Abrams |
| 7,381,284 B2 | | 6/2008 | Abrams |
| 7,390,552 B2 | | 6/2008 | Abrams |
| 7,393,576 B2 | | 7/2008 | Abrams |
| 7,402,222 B2 | | 7/2008 | Abrams |
| 7,410,682 B2 | | 8/2008 | Abrams |
| 7,413,581 B2 | | 8/2008 | Abrams |
| 7,465,485 B2 | | 12/2008 | Abrams |
| 7,632,371 B2 | | 12/2009 | Abrams |
| 7,749,589 B2 | | 7/2010 | Abrams |
| 7,799,164 B2 | | 9/2010 | Abrams |
| 8,007,889 B2 | | 8/2011 | Abrams |
| 8,168,262 B2 | | 5/2012 | Abrams |
| 8,206,800 B2 | | 6/2012 | Abrams |
| 8,354,050 B2 | | 1/2013 | Abrams |
| 8,475,905 B2 | | 7/2013 | Abrams |
| 2002/0098329 A1 | | 7/2002 | Abrams |
| 2003/0129353 A1 | | 7/2003 | Abrams |
| 2004/0050482 A1 | | 3/2004 | Abrams |
| 2004/0238103 A1 | | 12/2004 | Cano |
| 2005/0000622 A1 | | 1/2005 | Cano |
| 2005/0081985 A1 | | 4/2005 | Abrams |
| 2005/0193461 A1 | | 9/2005 | Caillibotte et al. |
| 2005/0223753 A1 | | 10/2005 | Nordstrom |
| 2005/0268407 A1 | | 12/2005 | Abrams |
| 2006/0010562 A1 | | 1/2006 | Bevier |
| 2006/0160943 A1 | | 7/2006 | Weir |
| 2006/0162050 A1 | | 7/2006 | Kaufman et al. |
| 2006/0183851 A1 | | 8/2006 | Liu et al. |
| 2007/0022510 A1 | | 2/2007 | Chapuis et al. |
| 2007/0022548 A1 | | 2/2007 | Abrams |
| 2007/0110949 A1 | | 5/2007 | Abrams |
| 2007/0148397 A1 | | 6/2007 | Abrams |
| 2007/0181241 A1 | | 8/2007 | Kramer et al. |
| 2007/0251636 A1 | | 11/2007 | Herbert |
| 2007/0289688 A1 | | 12/2007 | Abrams |
| 2007/0298681 A1 | | 12/2007 | Liu |
| 2008/0003399 A1 | | 1/2008 | Abrams |
| 2008/0006968 A1 | | 1/2008 | Abrams |
| 2008/0050548 A1 | | 2/2008 | Abrams |
| 2008/0095973 A1 | | 4/2008 | Abrams |
| 2008/0102239 A1 | | 5/2008 | Abrams |
| 2008/0111047 A1 | | 5/2008 | Abrams |
| 2008/0118695 A1 | | 5/2008 | Jarvis et al. |
| 2008/0145585 A1 | | 6/2008 | Abrams |
| 2008/0153388 A1 | | 6/2008 | Liu |
| 2008/0177415 A1 | | 7/2008 | Rahimi |
| 2008/0250668 A1 | | 10/2008 | Marvin et al. |
| 2008/0295216 A1 | | 12/2008 | Nordstrom et al. |
| 2009/0022929 A1 | | 1/2009 | Kramer et al. |
| 2009/0124150 A1 | | 5/2009 | Covelli et al. |
| 2009/0133181 A1 | | 5/2009 | Nordstrom et al. |
| 2009/0181599 A1 | | 7/2009 | Farmer et al. |
| 2009/0239025 A1 | | 9/2009 | Abrams |
| 2009/0280290 A1 | * | 11/2009 | Weedlun ................... 428/102 |
| 2009/0320174 A1 | | 12/2009 | Turner |
| 2010/0043114 A1 | | 2/2010 | Caillibotte et al. |
| 2010/0055358 A1 | | 3/2010 | Weaver et al. |
| 2010/0068447 A1 | | 3/2010 | Abrams |
| 2010/0092719 A1 | | 4/2010 | Abrams |
| 2010/0092720 A1 | | 4/2010 | Abrams |
| 2010/0143669 A1 | | 6/2010 | Abrams |
| 2010/0233410 A1 | | 9/2010 | Abrams |
| 2010/0316832 A1 | | 12/2010 | Abrams |
| 2011/0052859 A1 | | 3/2011 | Abrams |
| 2011/0053450 A1 | * | 3/2011 | Baqai et al. ................. 442/286 |
| 2011/0168319 A1 | | 7/2011 | Baqai et al. |
| 2011/0223373 A1 | | 9/2011 | Abrams |

OTHER PUBLICATIONS

"Adhesives for Decorative Apparel for High Quality Embroidered Emblems, Patches, and Sports Lettering," Bemis, Feb. 2002, 2 pages.
"Clarense" advertisement, Bemis, available at www.bemisworldwide.com on Aug. 28, 2006, 2 pages.
"EB3106 Apparel Product Data Sheet." Bemis, May 10, 2008, 1 page.
"EB3302 Apparel Product Data Sheet." Bemis, Feb. 23, 2010, 1 page.
"EB3304 Data Sheet." Bemis, Dec. 11, 2007, 1 page.
"Selector Guide: Thermoplastic Adhesives, Specialty Films & Seam Tape," Bemis, Jan. 2009, 8 pages.
"Sewfree® Adhesive Film & Tape," Bemis, Jul. 2006, 4 pages.
"Sewfree® Adhesive Film & Tape," Bemis, Jul. 2008, 6 pages.
"Sewfree® designed especially for garments," Bemis, Aug. 2008, 6 pages.

* cited by examiner

DIMENSIONAL, PATTERNED HEAT APPLIED APPLIQUE OR TRANSFER MADE FROM KNIT TEXTILE

CROSS REFERENCE TO RELATED APPLICATION

The present application claims the benefits of U.S. Provisional Application Ser. No. 61/356,425, filed Jun. 18, 2010, entitled "LEXTRA STRETCH MANUFACTURING PROCESS;" U.S. Provisional Application Ser. No. 61/358,679, filed Jun. 25, 2010, entitled "LEXTRA STRETCH MANUFACTURING PROCESS;" U.S. Provisional Application Ser. No. 61/364,312, filed Jul. 14, 2010, entitled "LEXTRA STRETCH MANUFACTURING PROCESS AND DESIGN;" U.S. Provisional Application Ser. No. 61/373,738, filed Aug. 13, 2010, entitled "LEXTRA- AND OBI-STRETCH™ MANUFACTURING PROCESS DESIGN;" U.S. Provisional Application Ser. No. 61/377,790, filed Aug. 27, 2010, entitled "LEXTRA- AND OBI-STRETCH™ MANUFACTURING PROCESS AND DESIGN;" U.S. Provisional Application Ser. No. 61/378,751, filed Aug. 31, 2010, entitled "LEXTRA- AND OBI-STRETCH™ MANUFACTURING PROCESS AND DESIGN;" U.S. Provisional Application Ser. No. 61/380,892, filed Sep. 8, 2010, entitled "LEXTRA- AND OBI-STRETCH™ MANUFACTURING PROCESS AND DESIGN;" U.S. Provisional Application Ser. No. 61/381,360, filed Sep. 9, 2010, entitled "LEXTRA- AND OBI-STRETCH™ MANUFACTURING PROCESS AND DESIGN;" U.S. Provisional Application Ser. No. 61/385,760, filed Sep. 23, 2010, entitled "LEXTRA- AND OBI-STRETCH™ MANUFACTURING PROCESS AND DESIGN;" U.S. Provisional Application Ser. No. 61/389,544, filed Oct. 4, 2010, entitled "LEXTRA- AND OBI-STRETCH™ MANUFACTURING PROCESS AND DESIGN;" U.S. Provisional Application Ser. No. 61/392,837, filed Oct. 13, 2010, entitled "LEXTRA- AND OBI-STRETCH™ MANUFACTURING PROCESS AND DESIGN;" U.S. Provisional Application Ser. No. 61/405,558, filed Oct. 21, 2010, entitled "LEXTRA- AND OBI-STRETCH™ MANUFACTURING PROCESS AND DESIGN;" U.S. Provisional Application Ser. No. 61/422,979, filed Dec. 14, 2010, entitled "LEXTRA- AND OBI-STRETCH™ MANUFACTURING PROCESS AND DESIGN;" U.S. Provisional Application Ser. No. 61/429,623, filed Jan. 4, 2011, entitled "LEXTRA- AND OBI-STRETCH™ MANUFACTURING PROCESS AND DESIGN;" U.S. Provisional Application Ser. No. 61/466,837, filed Mar. 23, 2011, entitled "LEXTRA-STRETCH, AND OBI-STRETCH™ AND/OR OBI-KNIT MANUFACTURING PROCESSES AND DESIGNS;" U.S. Provisional Application Ser. No. 61/467,656, filed Mar. 25, 2011, entitled "LEXTRA-STRETCH, AND OBI-STRETCH™ AND/OR OBI-KNIT MANUFACTURING PROCESSES AND DESIGNS;" U.S. Provisional Application Ser. No. 61/469,976, filed Mar. 31, 2011, entitled "LEXTRA-STRETCH™, AND OBI-STRETCH™ AND/OR OBI-KNIT™ MANUFACTURING PROCESSES AND DESIGNS;" U.S. Provisional Application Ser. No. 61/477,977, filed Apr. 21, 2011, entitled "LEXTRA-STRETCH™, OBI-STRETCH™ AND/OR OBI-KNIT™ MANUFACTURING PROCESSES AND DESIGNS;" U.S. Provisional Application Ser. No. 61/478,387, filed Apr. 22, 2011, entitled "LEXTRA-STRETCH™, OBI-STRETCH™ AND/OR OBI-KNIT™ MANUFACTURING PROCESSES AND DESIGNS;" U.S. Provisional Application Ser. No. 61/478,822, filed Apr. 25, 2011, entitled "LEXTRA-STRETCH™, OBI-STRETCH™ AND/OR OBI-KNIT™ MANUFACTURING PROCESSES AND DESIGNS;" and U.S. Provisional Application Ser. No. 61/481,477, filed May 2, 2011, entitled "LEXTRA-STRETCH™, OBI-STRETCH™ AND/OR OBI-KNIT™ MANUFACTURING PROCESSES AND DESIGNS;" all of which are hereby incorporated herein by this reference in their entirety.

FIELD

This disclosure relates generally to a uniquely-constructed applique embellishment which may be produced with elastomeric textiles and particularly to elastomeric knitted textiles.

BACKGROUND

Today's apparel for sports, fashion and many other markets are often constructed with stretchable and/or elastic materials to enhance values such as comfort, performance and aesthetics. The stretchable and/or elastic materials may comprise yarns containing elastomeric additives and knit or woven textiles constructed to provide a mechanical elasticity.

It is often desirable to embellish apparel having stretchable and/or elastic properties with a textile appliqué, such as a woven or non-woven appliqué. In providing a functional equilibrium, the textile appliqué should have a similar degree of stretchable and/or elastic properties compared to the apparel (article to be decorated) textile. Manufacturers have not been able to embellish elastic apparel with textile appliqués due to an inability to manufacture an appliqué that is elastic.

Producing stretchable and elastic textile appliqués has had limited success since the adhesive layer binding the textile applique to the elastic article to be decorated material tends to split and/or crack when stressed, such as when stretching and/or bending the article to be decorated material and/or textile applique. One region, in which the splits and cracks form, is the adhesive layer binding the appliqué to the stretchable article to be decorated. Not only do the splits and cracks detract from the artist quality of design, the splits and cracks degrade both the aesthetic and functional qualities of the design. The splits and cracks may result in a detachment of the textile appliqué from the adhesive layer and/or the stretchable article to be decorated. Furthermore, the stressing of the adhesive layer may cause the adhesive layer to fail to return to its original shape and/or size ("recover") after the stress causing force is removed. The failure of the adhesive layer to return to its original shape and/or size may not only distort the textile appliqué, it may also distort the article to be decorated to which the textile design is attached. The lack of recovery and/or cracks and splits may cause the textile appliqué to separate and/or detach from the article to be decorated material the textile appliqué is adhered to.

SUMMARY

These and other needs are addressed by the various aspects, embodiments, and configurations of the present disclosure. The present disclosure is directed generally to elastomeric appliqués, stickers, patches, and heat transfers and other textiles and methods and/or systems for making the same.

In one aspect, a method for forming an appliqué is provided that includes the steps:

(a) applying, at a sublimation temperature, a sublimation dye heat transfer image to appliqué media, the appliqué media comprising a knitted textile; and (b) adhering, typically after the sublimation dye transfer applying step, an elastomeric adhesive layer to the sublimation printed appliqué media to form the appliqué, wherein the sublimation temperature is above a melting temperature of the elastomeric adhesive layer.

In one aspect, an appliqué is provided that includes:

(a) an appliqué media comprising a printed appliqué media, the appliqué media comprising a knitted textile;

(b) an elastomeric adhesive layer adhered to the appliqué media, the elastomeric adhesive layer comprising a first adhesive film and an elastomeric film, the first adhesive film being positioned between the appliqué media and the elastomeric film, wherein one or more of a melting point and melt index and viscosity of the elastomeric film is greater than the melting point and melt index and viscosity, respectively, of the first adhesive layer.

In one aspect, an appliqué is provided that includes:

(a) an appliqué media comprising a printed appliqué media, the appliqué media comprising a knitted textile;

(b) an elastomeric adhesive layer adhered to the appliqué media, the elastomeric adhesive layer comprising:
  (i) a first thermoplastic adhesive film;
  (ii) an elastomeric film; and
  (iii) a second thermoplastic adhesive film, the first adhesive film being positioned between the appliqué media and the elastomeric film and the elastomeric film being positioned between the first and second adhesive films.

The appliqué can have valuable mechanical properties. One or more of a melting point and melt index and viscosity of the elastomeric film is greater than the respective melting point or melt index and viscosity of the first thermoplastic adhesive layer. A modulus of elasticity of each of the elastomeric adhesive layer is less than about 11.25 lbf. A thickness of the first and second adhesive films is no more than about 5 mils to control adhesive penetration into either the applique media or the material of the article to be decorated. A thickness of the elastomeric film is greater than each of the thicknesses of the first and second adhesive films to provide sufficient elasticity and recovery to control all layers of adhesive.

The first and second adhesive films may comprise thermoplastic adhesives. Preferably, one or both of the first and second adhesive films comprise thermoplastic polyurethanes.

The elastomeric film may be one or both of a rubber and an elastomer. The elastomeric film is preferably a cast, blown, or extruded film. It is preferably not woven or knitted and is substantially free of voids, such as those resulting from interlocking threads or fibers. In a preferred embodiment, the elastomeric film comprises polyurethane. In a more preferred embodiment, the elastic film comprises an elastomeric polyurethane.

The self-supporting, elastomeric adhesive layer may have a softening temperature from about 70° to about 85° Celsius. Preferably, the self-supporting, elastomeric adhesive layer has a recovery value, after being stretched, of at least about 95%. More preferably, the self-supporting, elastomeric adhesive layer has a melt flow index from about 40 dg/min to about 50 dg/min.

The elastomeric layer is commonly self-supporting and pre-formed. The textile appliqué media comprises, in one configuration, one or both of a plurality of flock fibers or a knitted textile material. Knitted textiles generally elastically deform more than woven textiles having yarn of the same composition due to a greater capacity for mechanical deformation. In other words, the yarn in a knitted textile generally moves more relative to adjacent fibers than in a woven textile, i.e. greater mechanical elasticity.

In one configuration, the self-supporting, elastomeric adhesive layer comprises an elastomeric film positioned between opposing first and second substantially continuously distributed first and second adhesive films. The first and second adhesive films and elastomeric film are substantially continuously distributed over an areal extent of the elastomeric film. Furthermore, the first adhesive film is substantially continuously distributed over an areal extent of an interface between the first adhesive film and the appliqué media. The first and second adhesive films are substantially free of holes and/or voids over the areal extent of the first and second adhesive films. The first and second adhesives have viscosities to maintain substantially continuous layers. Moreover, the first and second adhesives have viscosities, when applied to the elastomeric film, that form substantially continuous layers on the elastomeric film.

In one configuration, the knitted textile appliqué media is adhered to the first adhesive film, and a carrier sheet is releasably adhered to the second adhesive film, by a release coating.

In an embodiment, a textile article includes a article to be decorated, a plurality of flock fibers or knitted textile appliqué media, and a self-supporting, elastomeric adhesive layer having an elastomeric film positioned between opposing first and second adhesive films. The self-supporting, elastomeric adhesive layer is positioned between the article to be decorated and one or both of the plurality of flock fibers or the knitted textile appliqué media. The article to be decorated may comprise one or both of a stretchable and/or elastic material. Preferably, the article to be decorated comprises a stretchable and/or elastic item of apparel.

In one configuration, the flock fibers are incorporated as an insert, into the appliqué media. The flock fibers have opposing first and second fiber ends. The first fiber ends are in contact with the first adhesive film. Preferably, the first fiber ends are embedded in the first adhesive film. In one embodiment, the textile appliqué media has a, typically substantially rigid and/or inelastic, carrier sheet positioned adjacent to at least one of the second fiber ends or second adhesive film.

Yet another embodiment is a process for adhering the knitted textile appliqué media to the first adhesive film of the self-supporting, elastomeric adhesive layer. Preferably, the self-supporting, elastomeric adhesive layer further comprises a continuous, self-supporting elastomeric adhesive layer having a carrier sheet positioned on the second adhesive film. More preferably, the second adhesive film is positioned between the elastomeric film and the carrier sheet. One or both of heat and pressure may be applied to one or both of the knitted textile appliqué media and self-supporting, elastomeric adhesive layer to adhere the knitted textile appliqué media to the first adhesive film.

In another embodiment, the knitted textile of the elastomeric textile appliqué is contacted and adhered, by application of heat and pressure, to the first adhesive film of the self-supporting, elastomeric adhesive layer at the same time that the second adhesive film is contacted and adhered to the article to be decorated. The second adhesive film permanently adheres the knitted textile appliqué to the article to be decorated.

The appliqué of the various embodiments disclosed herein can have a number of commercial values. First, the appliqué can be applied to highly elastic fabric and recover from deformation as completely as the fabric. The appliqué does not typically split or distort in response to high degrees of deformation. The appliqué can remain firmly adhered to the article to be decorated even after high degrees of deformation of the appliqué or article to be decorated or both. The elastomeric or elastic film can provide sufficient adhesion to the appliqué while not only providing a soft, inner layer (making the appliqué soft or pliable to the touch) but also acting as a "stop" to the penetration of the adhesives by either the appliqué media or the textiles of the article to be decorated.

In some configurations, each layer typically performs a beneficial and synergistic function. The first adhesive film preferably does not flow too deeply into the elastic appliqué media, thereby preserving the elastomeric integrity of the whole appliqué. The second adhesive film preferably does not flow too deeply into the elastic article to be decorated, thereby preserving the elastomeric integrity of the article to be decorated. The elastomeric film layer preferably cannot flow at the temperatures used during manufacture, thereby maintaining the elastomeric integrity of the elastic film.

While not wishing to be bound by any theory, it is believed that the elastomeric film, by staying intact, provides an unhindered elastic or elastomeric layer that permits the elastic or elastomeric appliqué and article to be decorated to move, or deform, together and therefore the applique has enhanced elastic properties. Accordingly, the appliqué's potential for movement corresponds to that of the article to be decorated. In other words, no fibers from either the appliqué or article to be decorated are allowed to penetrate into the elastomeric layer to impede its performance. The outer two adhesives' viscosities are low enough for them to flow into the appliqué media and the textiles of the article to be decorated to create the mechanical grip or adhesion; however movement and penetration of the textiles of the applique media and the textiles of the article to be decorated are stopped when they reach the elastomoeric adhesive layer because with its higher viscosity it is not fluid enough for the textiles to move into it—they are stopped in a similar fashion as if it was a solid material. This same differential of adhesives layers is what prevents the outer two adhesives from being able to flow into and mix with the center elastomeric adhesive, because its viscosity and/or melt point are too high.

The minimum unimpeded thickness of the elastomeric layer for this result is believed to be around 2 mils (thousandths of an inch). While it is possible that a single layer may be used provided that an unimpeded elastomeric region is maintained, a preferred configuration uses at least two and more preferably at least three-layers, with the various layers having differing softening and/or melting points and/or viscosities. The present disclosure can attain a workable balance between the stretch power or elasticity of the adhesive films and the stretch power or elasticity of the textiles by controlling the positioning and thicknesses of the films.

By selecting carefully the various materials for the various layers in the appliqué, one can create a dimensionally flat graphic. The selection balances the tension (which is a function of the moduli of elasticity of the various layers). Stated another way, the moduli of elasticity of the first and second adhesive films and elastomeric film and, optionally, the elastic appliqué media layer itself should be within a selected percentage of one another. Wide variances in the moduli of elasticity can cause "curling" of the appliqué media, thereby producing an appliqué media that is not dimensionally flat.

The appliqué can transform the value of sublimation dye transfer printing embellishment into a new category of up-market and higher perceived value dimensionalized embellishment products. Sublimation printing can be used to provide precise design and color reproduction and the applique textile and/or yarns can produce an embroidery-like high luster appearance having a higher added-value look of dimension, texture, and design depth. Surface texture, for example, can be imparted using a ribbed or jacquard knit fabric, which is further coupled with a printed design to produce an integrated multi-dimensional effect.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The terms "a" or "an" entity refer to one or more of that entity. As such, the terms "a" (or "an"), "one or more" and "at least one" can be used interchangeably herein. It is also to be noted that the terms "comprising", "including", and "having" can be used interchangeably.

"Knit" refers to a fabric having a series of connected loops. The loops are generally made by intertwining yarn, thread, or strips in a series of consecutive loops, called stitches. As each row progresses, a new loop is pulled through an existing loop. The loops are generally easily stretched in different directions. Knitting normally uses one set of yarn which is worked either horizontally or vertically, not both. Knitting typically has two recognized knitting structures, namely warp and weft knitting. Warp knitting has one set of yarn for each wale, each yarn travelling vertically. Weft knitting has one set of yarn, which travels horizontally across the fabric.

"Woven" refers to a fabric comprising at least two sets of yarn, thread, or strips, one warp (longitudinal) and one filling yarn, thread, or strip (transverse or crosswise), normally laced at substantially right angles to each other. Commonly, the yarn, thread, or strips are straight, run parallel either lengthwise (warp threads) or crosswise (weft threads). The weft yarn is commonly interlocked with the warp by passing under then over, one or more warp threads. In comparison, yarn, thread, or strips in knitted fabrics commonly follow a meandering path (a course), forming substantially symmetric loops (also called bights) substantially symmetrically above and below the mean path of the yarn, thread, or strips. The meandering loops can be stretched easily in different directions, which generally give knitting much more elasticity than woven fabrics. Depending on the yarn content and knitting pattern, knitted fabrics can stretch as much as 500% or more. In contrast, woven fabrics stretch primarily along one direction (the bias) and are not as elastic, although elasticity can be increased when they are woven from yarn containing elastomeric yarn such as elastane (Lycra® from Invista or Dorlastan® from Bayer).

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations, as illustrated by the drawings referenced below.

DETAILED DESCRIPTION

The Appliqué

Figure 1:
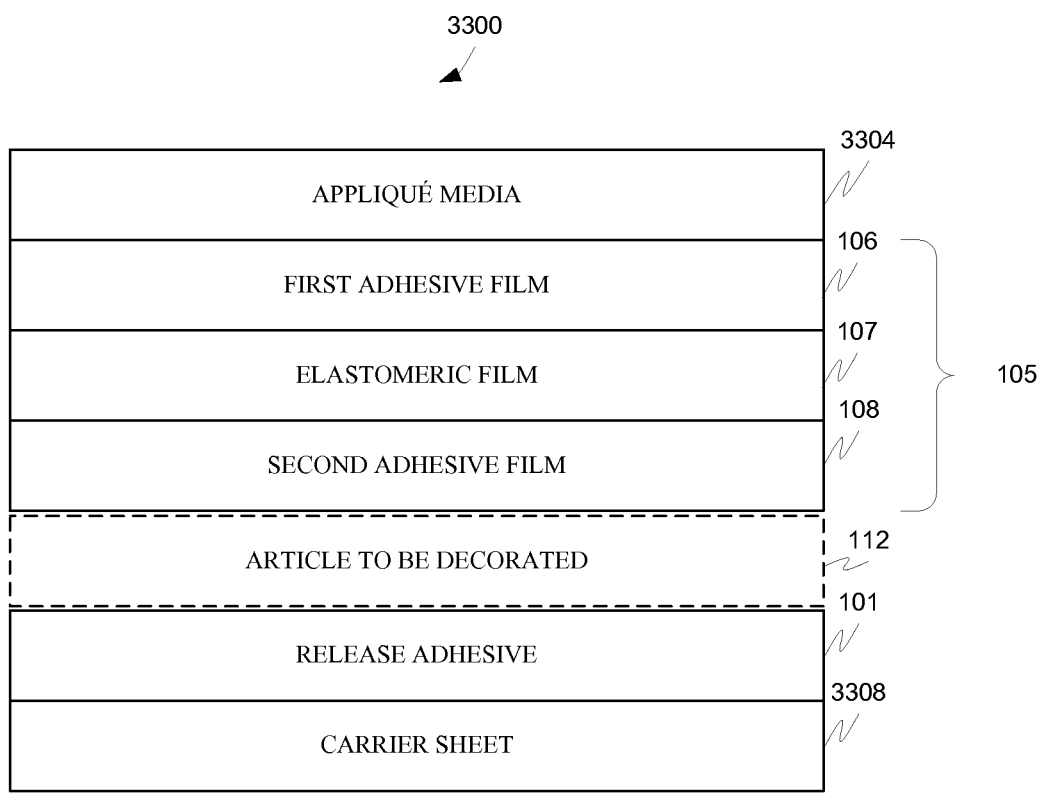
FIG. 1 depicts a appliqué according to an embodiment.

FIG. 1 depicts an appliqué 3300 according to an embodiment. The appliqué may be used for various applications, including as a sticker, patch, or heat transfer. As will be appreciated, an appliqué is adhered to an article to be decorated by applying heat directly to an appliqué media 3304 while a heat transfer is adhered to an article to be decorated by applying heat to a carrier sheet positioned above the appliqué media 3304. The appliqué 3300 includes an elastic or elastomeric appliqué media 3304, a first adhesive film 106 to bond the appliqué media 3304 to an elastomeric film 107, the elastomeric film 107, a second adhesive film 108 to bond the elastomeric film to a selected article to be decorated 112, a release adhesive 101, and a carrier sheet 3308. The first adhesive film 106, second adhesive film 108, and intervening elastomeric film 107 are collectively referenced as a self-supporting, elastomeric adhesive layer 105. The appliqué can have strong adhesion, high wash fastness, high abrasion resistance, and high softness and be lightweight.

In one application, the appliqué 3300 is adhered to an elastic article to be decorated and has an elasticity and recovery at least as much as the article to be decorated so that the appliqué 3300 moves along with the article to be decorated and does not wrinkle up, split, crack, pucker or bubble up, and/or pop off in response to a higher degree of deformation recovery by the article to be decorated than by the appliqué 3300. It also has an internal recovery force, or recovery pull strength, exerted on the article to be decorated that is equal to or less than the resistive force of the substrate (e.g., modulus of elasticity or bulk modulus or stiffness or tensile strength) to being deformed so that the appliqué does not cause the article to be decorated to curl in response to the recovery force. Properly balancing of these properties between the appliqué and attached article to be decorated can beneficially enable the appliqué and article to be decorated, when deformed, to recover to a substantially relaxed and flat or smooth state, without curling in either the appliqué or article to be decorated.

As discussed in more detail below, the appliqué media 3304 can be, for example, an elastane-containing material, such as Lycra® and Spandex™ (Dorlastan® by Bayer) and blends of one or both of Lycra® and Spandex™ with nylon, polyester, and cotton. The elastomeric film 107 is substantially free of embedded fibers and yarns from either the textiles of the appliqué media 3304 or article to be decorated. The first and second adhesive films 106 and 108 have thicknesses and melt indexes (melt point and viscosity at melt point) so that the flow and penetration depths, of the adhesive films into the adjacent textiles of the appliqué media 3304 and article to be decorated, respectively, are controlled. Too much penetration can cause the adhesive material to occupy inter-fiber or inter-yarn spaces in the appliqué media, thereby interfering with the elasticity and/or recovery of the appliqué media 3304 and/or article to be decorated. The elastomeric film 107 has higher softening and melt index and viscosity than the first and/or second adhesive, thereby preventing or inhibiting fiber penetration into the elastomeric film under thermal conditions needed to adhere the first adhesive film to the appliqué media and the second adhesive film to the article to be decorated. In one configuration, the melting point of the elastomeric film is higher than that of the first adhesive film and the melting point of the first adhesive film is higher than that of the second adhesive film.

In one application, the appliqué 3300 is applied to a deep-pile fabric article to be decorated. As will be appreciated, a deep-pile fabric refers to any of various woven or knitted fabrics that simulate fur.

In one application, the appliqué 3300 is applied to a substantially inelastic article to be decorated to provide surprising and synergistic effects. The peel, adhesion strength of the appliqué media 3304 can be higher with the elastomeric adhesive film than with a single adhesive film between the appliqué media and the article to be decorated.

In one application, an appliqué 3300 is provided in the form of a stretchable and elastic film, preferably having adhesive properties. The stretchable and elastic film commonly comprises three layers. One or more of the three layers is an adhesive layer. The adhesive layer is preferably a thick layer. The thick adhesive layer can substantially sink in an article to be decorated having a high-pile. Furthermore, the thick article to be decorated can provide a substantially stable foundation and/or base. For example, when the stretchable and elastic film is adhesively bound to the appliqué media, the stretchable and elastic film can provide a substantially stable foundation when the appliqué media is adhesively bonded to a high pile article to be decorated, such as a sweat band or terry-cloth article to be decorated.

The Appliqué Media

The appliqué media 3304 can be any elastic or elastomeric appliqué media (which generally includes a design). As used herein the term "an elastic or elastomeric appliqué media" refers to a textile material having elastomeric properties. The textile material may be a non-woven or knitted textile. The textile material may include other design elements, particularly flock.

The knitted textile can be formed by any knitting process, including but not limited to weft knitting (in which the wales are substantially perpendicular to the course of the yarn), warp knitting (in which the wales and courses are roughly parallel to each other), knit stitch, purl stitch, stockinette, reverse stockinette, garter stitch, seed stitch, right-plaited stitches, left-plaited stitches, flat knitting, circular knitting, a single yarn knit, a plurality of yarns knit, a double knit textile, an uneven knit, a shadow knit, a fair-isle knit, a plaited knit, flat knitting, circular knitting, or felt knitting. Examples of possible knit patterns or constructions include knits and purls, reversible stitch patterns, eyelets and lace, mosaic stitch patterns, multi-color stitch patterns, and the like. Specific examples of patterns include basketweave, basketweave II, box stitch, broken rib, cable stitch, casting on, casting off, checks and ridges, chevron, close checks, decrease, diagonal rib, diagonals, diamond pattern, double basket weave, double seed stitch, elongated chevron, embossed diamonds, embossed moss rib, garter rib, garter stitch, garter stitch steps, increase, Inverness diamonds, King Charles brocade, knit stitch, large diamonds, little pyramids, mistake rib, mock cable, moss diamonds, moss panels, moss stitch, moss stitch border diamonds, moss stitch parallelograms, parallelograms, parallelograms II, pavilion, pique triangles, plain diamonds, purl stitch, purled ladder, rib stitch, rice stitch, seed stitch, single chevron, slip stitch, spaced checks, squares, squares in squares, stocking stitch, thermal underwear stitch, triangles, triangle ribs, triangle squares, triangles, twin rib, two by two rib, windmill, woven stitch, yarn over, and combinations thereof. A preferred appliqué media has knit and purl stitches arranged substantially symmetrically (such as in ribbing, garter stitch, or seed stitch) so that the appliqué media lies flat.

While a number of knit patterns are set forth, it is important to understand that they are set forth as examples only and not by way of limitation. Any possible knit pattern or knitting method may be used. In one configuration, the knit is a warp knit. In one configuration, the knit is a circular knit. In many applications (such as in sportswear), a circular knit is more elastic and deformation recoverable than a warp knit.

Woven materials may also be used as the textile. The differing weave patterns are described in copending U.S. application Ser. No. 12/031,445, filed Feb. 14, 2008, which is incorporated herein by this reference.

The appliqué media may comprise a one-way stretch, two-way stretch, three-way, or four-way stretch appliqué media. That is, the appliqué media may stretch one of: more horizontally in a plane defined by the appliqué media than vertically relative to the appliqué media plane; more vertically relative to a plane defined by the appliqué media than horizontally in the appliqué media plane; less horizontally in a plane defined by the appliqué media than vertically relative to the appliqué media plane; or about equally horizontally and vertically relative to a plane defined by the appliqué media.

The appliqué media can have ornaments added to the knitting, such as bobbles, sequins, and beads. Long loops can also be drawn out and secured, such as in loop knitting.

Additional patterns can be made on the surface of the knitted fabric using embroidery. Ornamental pieces may be knitted separately and attached as appliqués.

Figure 2:
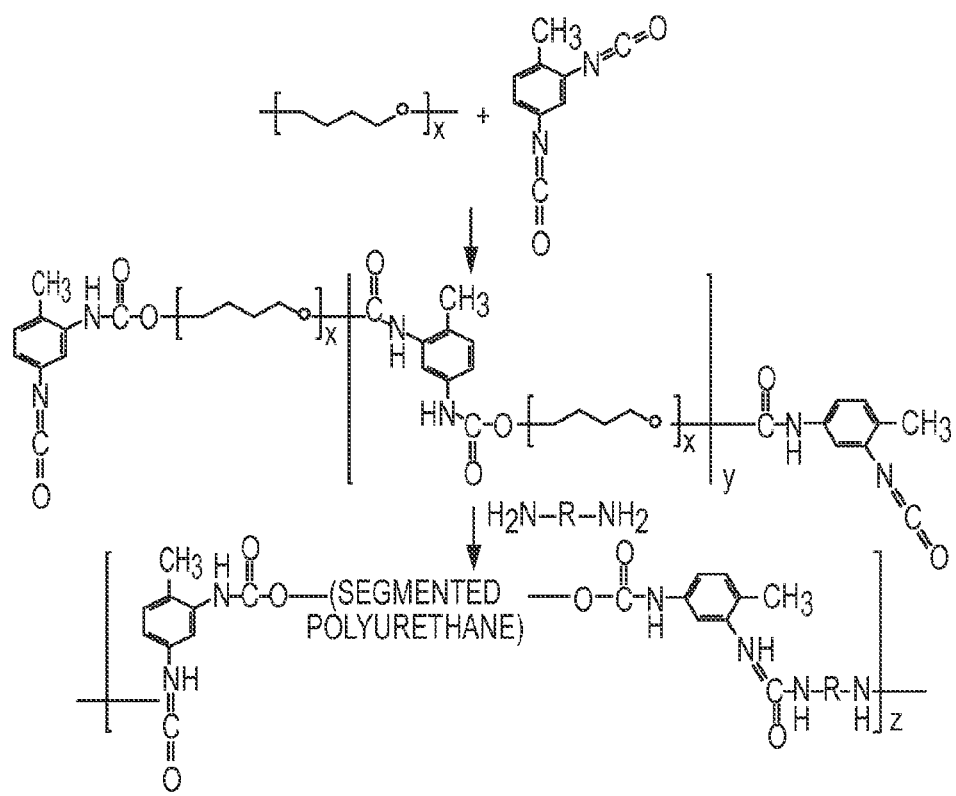
FIG. 2 depicts a pre-polymer according to an embodiment.

In one design configuration, the appliqué media 3304 comprises a stretchable, elastic, and/or elastomeric textile. The textile comprises one or more of a stretchable, elastic, and/or elastomeric polymer, fiber, weave, knit, or combination thereof. Preferably, the knit comprises a stretchable, elastic, and/or elastomeric knit. More preferably, the textile is a stretch fiber material, such as spandex, and even more preferably is a stretch fiber material solid under the trade name of Lycra® or Dorlastan® by Invista, formerly DuPont, or Tricot warp knits, though any of the stretch nylon or polyester knits and warp knit fabrics, including spandex, can be used. The material is also known as elastane. As will be appreciated, Lycra® has polymer chains with rigid and flexible portions, allowing the fiber both to stretch significantly and retain its shape. Lycra® is a segmented, polyurethane polymer manufactured by Invista. The structure of the Lycra® pre-polymer is provided in FIG. 2. The stretch fiber material may be used in fabric blends, such as cotton, silk, and synthetic fibers, such as nylon and polyesters. In one configuration, the appliqué media 3304 is one or more of a semi-dull Lycra® yarn, a tri-lobal Lycra® yarn, a Coolmax™ Lycra® fiber, and/or a heavy double-weave Lycra® fabric (which typically is a dimensional fabric having a weight/unit length of 14 oz/linear yard). In one configuration, the material in the appliqué media comprises a knit fabric incorporating at least about 3% spandex thread in combination with other natural and/or synthetic fiber threads, such as cotton or nylon, to provide a minimum stretch and recovery of typically about 5%, more typically about 7.5%, and even more typically about 10%. One particular stretch fabric in this configuration is Style 22700, Bright Techsheen™, manufactured by Darlington fabrics. This is a nylon/Spandex-based stretch fabric. The dimensionless fabric can simulate tackle twill. In one configuration, the dimensionless fabric is sublimation printed with an illusion of tackle twill. Typically, the stretch fiber material has a melting point of at least about 390° F. and even more preferably of at least about 500° F. and a softening temperature ranging from about 350 to about 390° F. The melting point is typically greater than a temperature to sublimation print a design or image on the appliqué media.

The Elastomeric Adhesive Layer

The elastomeric adhesive layer 105 includes the first and second adhesive films 106 and 108 and the intervening elastomeric film 107. These layers are discussed below.

The First and Second Adhesive Films 106 and 108

The properties of the first and second adhesive films 106 and 108 depend on the application.

The first 106 and second 108 adhesives commonly have viscosities to form substantially continuous layers. The second adhesive film 108 bonds the remainder of the appliqué to a desired article to be decorated 112, which can be a fabric, whether woven or nonwoven. Like the first and second adhesives, the elastomeric film is preferably a substantially continuously distributed cast, blown, or extruded film. Like the first and second adhesives, it may be a thermoset, co-extruded and/or noncompatible. It is preferably non-woven and not knitted and is substantially free of holes or voids, such as those resulting from interlocking threads or fibers. Preferably, the article to be decorated is itself an elastic material.

Each of the first 106 and second 108 adhesive films have minimum and maximum film thickness values. In one embodiment, the minimum film thickness will be no less than about 25% of the maximum film thickness for one or both of the first 106 and second 108 adhesive films. In a preferred embodiment, the minimum film thickness will be no less than about 50% of the maximum film thickness for one or both of the first 106 and second 108 adhesive films. In a more preferred embodiment, the minimum film thickness will be no less than about 75% of the maximum film thickness for one or both of the first 106 and second 108 adhesive films. In an even more preferred embodiment, the minimum film thickness will be no less than about 90% of the maximum film thickness for one or both of the first 106 and second 108 adhesive films.

Figure 4:
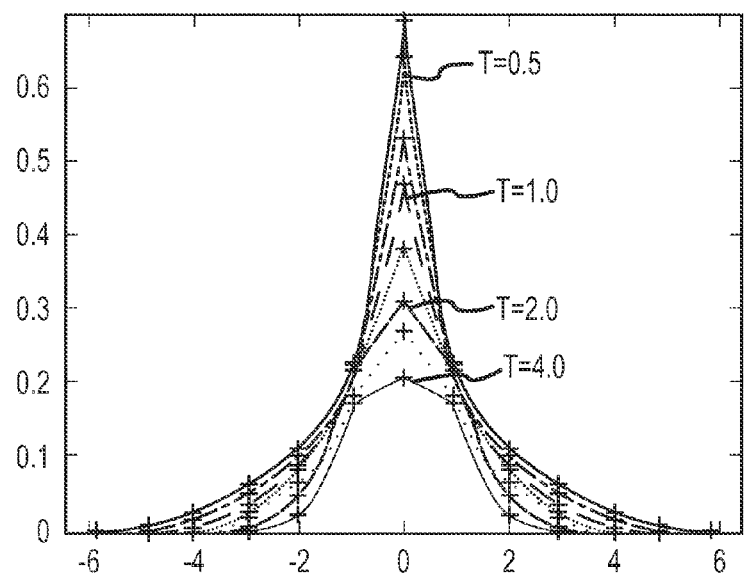
FIG. 4 depicts a Gaussian distribution having various t values.

In yet another embodiment, a plurality of film thickness values measured over the first and/or second areal extents for one or both of the first 106 and second 108 adhesive films may be represented in distribution resembling a Gaussian distribution having a "t" value of less than about 4 (FIG. 4). In preferred embodiment the "t" value for the Gaussian distribution of the plurality of adhesive film thickness values for one or both of the first 106 and second 108 adhesive films is less than about 2, even more preferred the "t" value is less than about 1. In yet an even more preferred embodiment, the "t" value for the Gaussian distribution of the plurality of adhesive film thickness values for one or both of the first 106 and second 108 adhesive films is less than about 0.5.

In another embodiment, at a given temperature a melt viscosity, or melt flow index, of the first adhesive film 106 is lower than a melt viscosity, or melt flow index, of the second adhesive film 108. At the relatively thin thickness of the first adhesive film 106, the adhesive will not over-penetrate between the fibers of the appliqué media, thereby creating aesthetic issues.

In one configuration, a thickness of each of the first and second adhesive films is no more than about 5 mils (127 mm), even more typically no more than about 2.5 mils (64 mm), and even more typically no more than about 2.0 mils (51 mm) and often ranges from about 0.25 mil to about 5 mils and even more often from about 0.5 mils to about 5 mils while a thickness of the elastomeric film 107 is at least about 1 mil (25.4 mm), even more typically at least about 2 mils, more typically is at least about 3 mils, more typically is at least about 4 mils, more typically at least about 5 mils, more typically at least about 10 mils (254 mm), and even more typically ranges from about 2 to about 50 mils. In one configuration, each of the first and second adhesives 106 and 108 will have a thickness ranging from about 5 to about 1,000 μm, more typically from about 10 to about 500 μm, more typically from about 15 to about 400 μm, more typically from about 15 to about 325 μm, and even more typically from about 20 to about 250 μm.

In a preferred embodiment, each of the first 106 and second 108 adhesive films comprise one of a thermosetting, a thermoplastic or combination thereof adhesive. Preferably, the first 106 and second 108 adhesive films comprise thermoplastic adhesives. Thermoplastic means the material will repeatedly soften when heated and hardened with cooled. Thermosetting means the material will undergo or has undergone a thermosetting chemical reaction by the action of heat, catalyst, ultraviolet energy or such. The thermosetting chemical reaction forms a relatively infusible state. The first 106 and second 107 adhesive films may be the same or differ in one or more chemical and/or physical properties. Preferably, the first 106 and second 107 adhesive films have substantially the same chemical and/or physical properties. A chemical property means any chemical reactivity property associated with the first 106 and second 108 adhesive films. A physical property means any property not associated with a chemical change in the substance and/or one or more substances associated with the first 106 and second 108 adhesive films. Non-limiting examples of physical properties are: absorption, concentration, density, dielectric, ductility, fluidity, fluid flow, malleability, melt and/or softening point, permeability, solubility, specific heat, viscosity, shear, stress, recovery, elasticity, and melt flow index. Non-limiting examples of chemical properties are: composition, bond structure, chemical stability. More preferably, the first 106 and second 108 adhesive films substantially comprise substantially the same thermoplastic adhesive compositions.

The mechanical properties of the first and second adhesive films can be similar to those of the elastomeric film (discussed below). The first and second adhesive films preferably have a modulus of elasticity of less than about 11.25 pounds per foot ("lbf") (50 N), more preferably of no more than about 5.625 lbf (25 N), and even more preferably of no more than about 2.8215 lbf (12.5 N) at both 40% and 100% elongation. The modulus of elasticity for the material selected is preferably above about 0.5 lbf (2.22 N) (where the modulus is defined as the force required to pull a ¼ inch sample from 3 inches to 6 inches). As the modulus of elasticity (sometimes also referred to as Young's Modulus) is a fundamental material constant, the modulus is an index of the stiffness of the material. A higher value of the modulus indicates a more brittle material (i.e. glass, ceramics). A very low value represents an elastomeric material (i.e. rubber). The first and second adhesive films preferably have an elongation of at least about 200% and more preferably at least about 300% and a recovery of at least about 75% and more preferably at least about 95% at such elongations. The recovery is the percent of the first and second adhesive films' shapes retained after the film is stretched to 100% of its original length at a rate of 30 inches per minute and the stretched film allowed to retract freely for 1 minute.

Suitable thermoplastic adhesive compositions comprise homopolymers, copolymers or polymer alloy comprising one or more of polyolefins, polystyrenes, polyvinyls, polyacrylics, polyhalo-olefins, polydienes, polyoxides, polyesthers, polyacetals, polysulfides, polythioesters, polyamides, polythioamides, polyurethanes, polythiourethanes, polyureas, polythioureas, polyimides, polythioimides, polyanhydrides, polythianhydrides, polycarbonates, polythiocarbonates, polyimines, polysiloxanes, polysilanes, polyphosphazenes, polyketones, polythioketones, polysulfones, polysulfoxides, polysulfonates, polysulfoamides, polyphylenes, and combinations and/or mixtures thereof. More specifically in a preferred embodiment, the thermoplastic adhesive composition comprises one of acrylonitrile butadiene styrene, acrylic (PMMA), celluloid, cellulose acetate, cyclo-olefin copolymer, ethylene-vinyl acetate (EVA), ethylene vinyl alcohol (EVOH), fluoroplastic (PTFE, FEP, PFA, CTFE, ECTFE, and/or ETFE), ionomer, liquid crystal polymer (LCP), polyacetal (POM and/or acetal), polyacrylate (acrylic), polyacrylonitrile (PAN or acrylonitrile), polyamide (PA or nylon), polyamide-imide (PAI), polyaryletherketone (PAEK and/or ketone), polybutadiene (PBD), polybutylene (PB), polybutylene terphthalate (PBT), polycaprolactone (PCL), polychlorotrifluoroethylene (PCTFE), polyethylene terephthalate (PET), polycycloheylene dimethylene terephthalate (PCT), polycarbonate (PC), polyhydroxylalkanoate (PHA), polyketone (PK), polyester, polyethylene (PE), polyetherketoneketone (PEKK), polyetherimide (PEI), polyethersulfone (PES), polysulfone, polyethlenechloriate (PEC), polyimide, polyacetic acid (PLA), polymethylpentene (PMP), polyphenylene oxide (PPO), polyphylene sulfide (PPS), polyphthalamide (PPA), polypropylen (PP), polystyrene (PS), polsulfone (PSU), polytrimethylen terphthalate (PTT), polyurethane (PU), polyvinyl acetate (PVA), polyvinyl chloride (PVC), polyvinylidene chloride (PVDC), styrene-acrylonitrile (SAN), and combinations thereof. In an even more preferred embodiment, the thermoplastic adhesive comprising the first 106 and second 108 adhesive films comprise one or more of polyurethane, polyvinyl acetate, polyamide, polyacrylate and combinations thereof. In a more preferred embodiment, the thermoplastic adhesive comprising the first 106 and second 108 adhesive films comprise polyurethanes or polyesters.

The first 106 and second 108 adhesive films have one or more of melt flow index and softening point. The softening point refers to the temperature at which the adhesive becomes one or more of tacky, soft to the touch and/or pliable at a pressure of from about 1 psi to about 100 psi, preferably at a pressure from about 5 psi to about 50 psi, more preferably, at a pressure from about 10 psi to about 40 psi. Preferably, the softening point of one or both of the first 106 and second 108 adhesive films ranges from about 50 degrees Celsius to about 185 degrees Celsius, more preferably from about 50 degrees Celsius to about 140 degrees Celsius, more preferably from about 60 degrees Celsius to about 100 degrees Celsius, and even more preferably from about 75 degrees Celsius to about 85 degrees Celsius. The melt flow index is measured at 175° C. under a 2.16 kg mass. The melt flow index for first and second adhesive films preferably ranges from about 5 dg/min to about 100 dg/min, more preferably from about 5 dg/min to about 75 dg/min, more preferably from about 10 to about 60 dg/min, and even more preferably from about 35 to about 50 dg/min.

In another embodiment, the second adhesive film 108 is a pressure sensitive adhesive rather than a heat applied adhesive.

The Elastomeric Film 107

The elastomeric film 107 has a minimum and maximum elastomeric film thickness value. In one embodiment, the minimum elastomeric film thickness will be no less than about 25% of the maximum elastomeric film thickness. In a preferred embodiment, the minimum elastomeric film thickness will be no less than about 50% of the maximum elastomeric film thickness. In a more preferred embodiment, the minimum elastomeric film thickness will be no less than about 75% of the maximum elastomeric film thickness. In an even more preferred embodiment, the minimum elastomeric film thickness will be no less than about 90% of the maximum elastomeric film thickness.

Generally, a thickness of the elastomeric film 107 will exceed the thicknesses of each of the first and second adhesive films but the total thickness of the first and second adhesive films exceeds the thickness of the elastomeric film 107.

In one configuration, the elastomeric film 107 has a thickness typically ranging from about 5 to about 1,000 µm, from about 10 to about 950 µm, more typically from about 15 to about 900 µm, more typically from about 20 to about 850 µm, more typically from about 125 to about 800 µm, more typically from about 375 to about 750 µm, and more typically from about 400 to about 750 µm. In one configuration, the elastomeric film 107 has a thickness ranging from about 15 to about 1,000 µm, more typically from about 25 to about 500 µm, more typically from about 75 to about 200 µm, more typically from about 50 to about 150 µm, and more typically from about 50 to about 75 µm.

In one configuration, the elastomeric film 107 will have a thickness ranging from about 5 to about 1,000 µm, even more typically from about 10 to about 500 µm, and even more typically from about 15 to about 250 µm.

In yet another embodiment, a plurality of film thickness values for the elastomeric film 107 measured over the first and/or second areal extents may be represented in distribution resembling a Gaussian distribution having at value of less than about 4 (FIG. 4). In preferred embodiment the t value for the Gaussian distribution of the plurality of elastomeric film thickness values is less than about 2, even more preferred the t value is less than about 1. In yet an even more preferred embodiment, the t value for the Gaussian distribution of the plurality of elastomeric film thickness values is less than about 0.5. In one configuration, the "t" values from the first and second adhesive films are no more than the "t" value for the elastomeric film 107.

In another embodiment, the elastomeric properties of the elastomeric film 107 are substantially independent of any discontinuities that may exist within the elastomeric film 107. The elastomeric properties of the elastomeric film 107 are substantially due to the chemical and/or physical properties of the elastomeric materials comprising the elastomeric film 107. That is, the elastomeric film is substantially elastomeric with or without discontinuities present within the elastomeric film 107. The phrase "substantially continuous" means that a film or layer substantially covers and/or coats the entire areal extent of a surface over which the film or layer is said to be substantially continuous. Moreover, "substantially continuous" means the film or layer is substantially free of holes and/or voids.

The elastomeric film 107 comprises a polymeric material. The polymeric material may be one of a thermoplastic material, a thermosetting material and a combination of thermoplastic and thermosetting polymeric materials. In a preferred embodiment, the elastomeric film 107 comprises one of styrene-buatdiene rubber, polyputadinene, ethylene-propylene rubber, butyl and halobutyl rubber, nitrile rubber, hydrogenate nitrile rubber, acrylic elastomers (such as, but not limited to ACM, AEM and EEA), chlorinate polyethylene elastomers, chloroprene elastomers, chlorosulfonated polyethylene elastomers, epichlorohydrin elastomers, fluoroelastomers, fluorosilicone elastomers, polysulfide elastomers, silicone elastomers, urethane elastomers, vinyl acetate copolymer elastomers, spandex, nylon, or other suitable elastomeric materials and combinations thereof. More preferably, the elastomeric film 107 is a polyurethane.

Preferably, the elastomeric film 107 is polymer having one of more of the following properties: at least some amorphous phases, a glass transition temperature less than ambient temperature, and viscoelastic and/or elastic physical properties.

In one configuration, the elastomeric film 107 is a preferably high-integrity, high-tensile strength layer to provide dimensional stability while still being thin, light weight, and soft. It may be dyed or colored, such as having added optical opacity. As will be appreciated, optical opacity substantially inhibits or blocks the passage of wavelength bands of light; that is, the elastomeric film 107 typically blocks the passage of at least about 50%, even more typically of at least about 75%, and even more typically at least about 90% of visible light wavelengths. The opacity inhibits the color of the textile of the article to be decorated from impairing the appearance of the design and can be imparted by any technique, such as using a white (e.g., titanium dioxide) pigment or dye. The first adhesive film is preferably relatively thin (e.g., less than about 5 mm and even more preferably less than about 1 mm) and bonds aggressively to the media. The second adhesive film is preferably a low viscosity and low melt-point, fast-flowing penetrating adhesive that both flows into the article to be decorated to intermingle with it while at the same time maintaining intimate contact with the middle layer. Typically, the melting and softening point of the second adhesive film will be less than, even more preferably at least about 25° F., and even more preferably at least about 50° F. less than the melting and softening points of the first adhesive film and elastomeric film. The melting and softening points of the elastomeric film are preferably greater, even more preferably at least about 25° F., and even more preferably at least about 50° F. greater than the melting and softening points of either the first or second adhesive film. Typically, the melting and softening points of the elastomeric film is at least about 400° F. and even more typically at least about 410° F.

In one configuration, the first and/or second adhesive films 106 and 108 have one or more properties similar to those of the elastomeric film 107 (e.g., and/or the one or more properties of the films 106, 107, and 108 fall within the numerical ranges set forth above for the elastomeric film 107).

At least one, if not both, of the pre-formed and self-supporting, elastomeric layer 105 and the elastomeric film 107 should be durable, thermally stable, and able to resist the various treatments including but not limited to lamination processes, applying chemicals, washing, heating, drying, both during and after application to the article. The terms "elastic" and "elastomeric" as used herein means those materials that have the ability to regain, at least substantially, their original shape after a load is removed. The elastomeric layer 105 and the elastomeric film 107 preferably have a modulus of elasticity of less than about 11.25 pounds per foot ("lbf") (50 N), more preferably of no more than about 5.625 lbf (25 N), and even more preferably of no more than about 2.8215 lbf (12.5 N) @ both 40% and 100% elongation. The modulus of elasticity for the material selected is preferably above about 0.5 lbf (2.22 N) (where the modulus is defined as the force required to pull a ¼ inch sample from 3 inches to 6 inches). As the modulus of elasticity (sometimes also referred to as Young's Modulus) is a fundamental material constant, the modulus is an index of the stiffness of the material. A higher value of the modulus indicates a more brittle material (i.e. glass, ceramics). A very low value represents an elastomeric material (i.e. rubber). The elastomeric layer 105 and the elastomeric film 107 preferably have an elongation of at least about 200% and more preferably at least about 300% and a recovery of at least about 75% and more preferably at least about 95% at such elongations. The recovery is the percent of the elastomeric layer's and the elastomeric film's shape retained after the film is stretched to 100% of its original length at a rate of 30 inches per minute and the stretched film allowed to retract freely for 1 minute.

The elastomeric adhesive layer 105 has a typical (total) minimum thickness of at least about 0.0010 inches, more typically at least about 0.0025 inches, and even more typically at least about 0.0050 inches, and more typically at least about 0.0075 inches, and even more typically at least about 0.0100 inches, and a maximum thickness of typically no more than about 0.0750 inches, even more typically no more than about 0.0500 inches, even more typically no more than about 0.0250 inches, and even more typically no more than about 0.0100 inches. The elastomeric adhesive layer 105 has a minimum melt flow index typically of at least about 10 g/10 min, more typically of at least about 15 g/10 min, and even more typically of at least about 25 g/10 min, and a maximum melt flow index typically of no more than about 75 g/10 min, more typically no more than about 65 g/10 min, and even more typically no more than about 50 g/10 min.

In one embodiment, the self-supporting, elastomeric adhesive layer 105 is supplied as a tri-laminate film. The self-supporting, elastomeric adhesive layer 105 may be supplied with or without a second, typically substantially inelastic, carrier sheet 3308. Preferably, the carrier sheet 3308 is positioned on at least one of the first 106 and second 108 adhesive films.

A preferred three-layer elastomeric adhesive layer 105 is seam tape sold by Bemis Associates UK or Bemis Manufacturing Company under the tradename ETEB3302™ or EB3302™ (3-layer polyurethane, which has a softening and melting temperature of the elastomeric film typically above about 350° F. and even more typically above about 400° F. and a softening and melting temperature of the first and second adhesive films preferably of no more than about 350° F., more preferably of no more than about 300° F., and even more preferably of no more than about 275° F.; a preferred glue line temperature of from about 100 to about 150° C. and an even more preferred glue line temperature of from about 120 to about 130° C. for a flat press; and a preferred glue line temperature of from about 200 to about 300° C. and an even more preferred glue line temperature of from about 200 to about 250° C. for a continuous bonding machine), EB3304™ (3-layer polyurethane, which has a softening and melting temperature of the elastomeric film typically above about 300° F. and even more typically above about 350° F. and a softening and melting temperature of the first and second adhesive films preferably of no more than about 300° F., more preferably of no more than about 275° F., and even more preferably of no more than about 265° F.; a preferred glue line temperature of from about 100 to about 150° C. and an even more preferred glue line temperature of from about 120 to about 130° C. for a flat press; and a preferred glue line temperature of from about 200 to about 300° C. and an even more preferred glue line temperature of from about 200 to about 250° C. for a continuous bonding machine), EB3106™ (3-layer polyurethane, which has a softening and melting temperature of the elastomeric film typically above about 300° F. and even more typically above about 350° F. and a softening and melting temperature of the first and second adhesive films preferably of no more than about 300° F., more preferably of no more than about 275° F., and even more preferably of no more than about 265° F.; a preferred glue line temperature of from about 100 to about 250° C. and an even more preferred glue line temperature of from about 160 to about 190° C. for a flat press; and a preferred glue line temperature of from about 200 to about 300° C. and an even more preferred glue line temperature of from about 200 to about 250° C. for a continuous bonding machine), 3410™ (a urethane tape having a modulus in the range of about 54 gms to about 66 gms, with about 60 gms being preferred and a softening point of about 120° C.), and 3914™ (which has a softening and melting temperature of the elastomeric film typically above about 350° F. and even more typically above about 400° F. and a softening and melting temperature of the first and second adhesive films preferably of no more than about 375° F., more preferably of no more than about 350° F. and even more preferably of no more than about 330° F.). Other preferred three-layer seam tapes sold by Bemis under the tradenames SRT3009™ (nylon tricot/polyurethane barrier/polyurethane adhesive), ST306™ (polyurethane/polyurethane/nylon triocot), and ETEB3106™ (3-layer polyurethane.

Yet another preferred three-layer elastomeric adhesive layer 105 includes a polyester (not a polyurethane) first adhesive film, a polyurethane elastomeric film, and a polyester (not a polyurethane) second adhesive film. The elastomeric film has higher softening and melting points than the first and second adhesive films. When melted, the first and second adhesive films have lower viscosities than the elastomeric film.

In another embodiment, the self-supporting, elastomeric adhesive layer 105 may be supplied as a bi-laminate. In one configuration, the bi-laminate may comprise the first 106 and second 108 adhesive films without the elastomeric film 107 therebetween. In another configuration, the bi-laminate may comprise the first adhesive film 106 and the elastomeric film 107. When the bi-laminate comprises the first adhesive film 106 and the elastomeric film 107, one of ordinary skill in art would understand that the second adhesive film 108 may be provided during one of the processes and/or systems described herein to form the tri-laminate self-supporting, elastomeric layer 105 within the products, articles, processes and systems described herein.

A preferred 2-layer elastomeric adhesive layer is seam tape sold by Bemis under the tradenames SRT 1010™ (polyurethane adhesive/nylon fabric), ST-104™ (2-layer polyurethane), ST-503™ (2-layer polyurethane), ST-504™ (2-layer polyurethane), and ST-604™ (2-layer polyurethane).

The self-supporting, elastomeric adhesive layer 105 has one or more of a modulus, thickness and recovery value. The modulus refers to the force required to pull at a specific sample gauge of a 25.4 mm wide sample, respectively, to 40% and 100%. The recovery refers to the percent of shape retained after being stretched at a rate of 304 mm per minute and allowed to retract freely for a single minute to 100% of its original length. The melt flow index refers to the rate of molten adhesive flow at 175 degrees Celsius under 2.17 kg load. Preferred modulus values are given in Table I. The recovery value for the self-supporting, elastomeric adhesive layer 105 is preferably at least about 75%, preferably at least about 90%. More preferably, the recovery value for the self-supporting elastomeric adhesive layer 105 is at least about 95%, even more preferably at least about 99%.

Preferred properties of the elastomeric adhesive layer 105 are provided in Table I below:

The elastomeric adhesive layer 105, and each of its components, namely the first and second adhesive films and elastomeric film, have a preferred modulus@40% elongation of from about 1 N to about 25N, even more preferably from about 2 to about 20N, and even more preferably from about 2 to about 10N and a preferred modulus@100% elongation of from about 1 N to about 50N, even more preferably from about 2 to about 25N, and even more preferably from about 2 to about 12.5N.

In another embodiment, the stretchable and elastic film has a high resistance to splitting when the film is substantially stretched. The stretchable and elastic film has substantial elastomeric properties preferably when elongated about 100%, more preferably when elongated about 150%, more preferably when elongated about 200%, and even more preferably when elongated about 400%. Recovery is preferably at least about 85%, more preferably at least about 90%, more preferably at least about 95%, more preferably at least about 97%, more preferably at least about 98%, and even more preferably at least about 99%.

In one configuration, one or more of the films is a cast film.

In one configuration, one or more of the films is a blown film. In a blown film operation, two or more of the films are coextruded and become welded together during the production. For example, a base film can be cast or extruded and a second film extruded or coated onto the base film, such as first or second adhesive film or elastomeric film. A third film would require a third pass.

In another embodiment, the self-supporting, elastomeric adhesive layer 105 may be formed by applying (such as, printing, screen-printing, applying, or depositing) the first adhesive film 106 to a base material (such as, but not limited to the carrier sheet 3308, an item of apparel, or item of commerce). Thereafter, contacting and/or applying the second adhesive film 108 to the elastomeric film 107, such that the first 106 and second 108 adhesive films are positioned on opposing surfaces of the elastomeric film 107. It can be appreciated that, the self-supporting, elastomeric adhesive layer 105 may be formed by different processes, such as, but not limited to: a) applying and/or contacting the first adhesive film 106 with the elastomeric film 107 prior to contacting and/or applying the first adhesive film 106 to the base material; b) applying and/or contacting the second adhesive film 108 with the elastomeric film 107 prior to contacting and/or applying elastomeric film 107 with the first adhesive film 106; or c) substantially contacting and/or forming (such as by extrusion) the elastomeric film 107 with the first 106 and second 108 adhesive films. In a preferred embodiment, the first 106 and second 108 adhesive films are applied as water-based suspensions, emulsions, or dispersions. The first 106 and second 108 adhesive films further form as the water is

TABLE I

| | Modulus Values | | | | | | | | |
|---|---|---|---|---|---|---|---|---|---|
| | Composition | | | | | | | | |
| | A | B | C | D | E | F | G | H | I |
| Bi or Tri Layer | Bi | Bi | Bi | Bi | Bi | Bi | Bi | Tri | Tri |
| Thickness | 18 μm | 50 μm | 75 μm | 50 μm | 50 μm | 50 μm | 200 μm | 200 μm | 100 μm |
| Modulus @40% | 1.2 N (0.3 lbs) | 7.6 N (1.7 lbs) | 6.2 N (1.4 lbs) | 4.5 N (1.0 lbs) | 1.8 N (0.4 lbs) | 3.6 N (0.8 lbs) | 5.2 N (1.2 lbs) | 19.6 N (4.4 lbs) | 7.7 N (1.7 lbs) |
| Modulus @100% | 1.6 N (0.4 lbs) | 8.9 N (2.0 lbs) | 8.96 N (2.0 lbs) | 7.1 N (1.6 lbs) | 3.6 N (0.8 lbs) | 6.2 N (1.4 lbs) | 7.2 N (1.6 lbs) | 25.4 N (5.7 lbs) | 10.2 N (2.3 lbs) | removed (through evaporation or applying of heat) from the as applied water-based suspensions, emulsions, or dispersions.

In another embodiment, the self-supporting elastomeric adhesive layer 105 comprises primarily, if not entirely, one or more of the elastomeric film 107, first adhesive film, or second adhesive film. In one configuration, the elastomeric film 107 is adhered directly to the appliqué media 3304 and/or article to be decorated in the absence, or substantial absence, of the first and second adhesive films 106 and 108, respectively. In this configuration, the elastomeric film 107 can have a thickness that is the cumulative thickness set forth below for the elastomeric adhesive layer 105. The thickness of the elastomeric film 107, when the elastomeric film 107 is adhered directly to the appliqué media and/or article to be decorated, should be sufficient for a minimal thickness 2818 of the elastomeric film 107 to be substantially or completely free of fiber penetration.

In another embodiment, the applique 3300 is a heat transfer, with a carrier sheet in contact with a release adhesive and the release adhesive in turn in contact with the free surface of the appliqué media.

The Release Adhesive

Returning to FIG. 1, the release adhesive 101 is selected such that the bonding force between the release adhesive 101 and the second adhesive film 108 is less than the bonding force between the self-supporting, elastomeric adhesive layer 105 and the appliqué media 3304. The release adhesive 101 may be any adhesive that adheres more strongly to the carrier sheet 3308 than the appliqué media 3304 but adheres to both enough to hold them together. For example, the release adhesive 101 may be any temporary adhesive, such as a resin or a copolymer, e.g., a polyvinyl acetate, polyvinyl alcohol, polyvinyl chloride, polyvinyl butyral, acrylic resin, polyurethane, polyester, polyamides, cellulose derivatives, rubber derivatives, starch, casein, dextrin, gum arabic, carboxymethyl cellulose, rosin, silicone, or compositions containing two or more of these ingredients. Preferably, the release adhesive 101 is a water-based adhesive, that is the release adhesive 101 is one or more of dispersed, dissolved, suspended or emulsified within water.

The Carrier Sheet

The carrier sheet 3308 may be any material that is dimensionally stable under the conditions of temperature and pressure encountered during any of the processing conditions presented herein. Typically, but not always, the carrier sheet 3308 is a discontinuous as opposed to a continuous sheet on a running web line. The carrier sheet 3308 may be any low-cost, dimensionally stable article to be decorated, such as paper, plastic film, and the like, preferably in the form of a discontinuous sheet or a running web line material.

The Article to be Decorated

The article to be decorated (not shown) to which the second adhesive film 108 is adhered may comprise any material. Non-limiting examples of suitable article to be decorated materials comprise metallic materials, synthetic or natural polymeric materials, glass-based materials, ceramic materials, leather-based materials and combinations thereof and may or may not be stretchable and/or have elastic properties. In a preferred embodiment, the article to be decorated comprises a stretchable, elastic, and/or elastomeric material having similar elastic properties (e.g., preferably within about 25%, more preferably about 20%, and even more preferably about 15% of the modulus of the appliqué media) to the appliqué media. An elastic property includes one or more of modulus of elasticity, bulk modulus, stiffness, and tensile strength. Preferably, the article to be decorated comprises one or both of an elastomeric polymeric material and a stretchable and elastic-knit and/or stretchable and elastic-weave material.

Non-limiting examples of elastomeric polymeric materials comprise one or more of rubbers, polyisoprenes, polybutadinenes, styrene-butadienes, chloroprenes, ethylene propylene rubbers, ethylene-vinyl acetates, ethylene propylene diene rubbers, polyacrylic rubbers, epichlorohydrin rubbers, fluorosilicones, fluoroelasters, silicones, perfluoroelastomers, polyether block amides, chlorosulfonated polyethylenes and combinations thereof). Non-limiting examples of stretchable and elastic-knits/stretchable and elastic-weaves are sprang waves, mesh-weaves, open weaves, warp knits, and two-way knits. While not wanting to be limited by example, suitable stretchable and elastic-knits/stretchable and elastic-weave textile materials are Lycra™, Spandex™, 4-, 3-, 2-, or 1-way stretch fleece fabrics, and stretch cotton weaves (such as, stretch rayon jersey knit and/or cotton/Lycra™ combinations).

In a preferred embodiment, the article to be decorated comprises an item of apparel, preferably a stretchable, elastic, and/or bendable item of apparel. Non-limiting examples of stretchable and elastic items of apparel are jerseys, leotards, pants, shirts, blouses, leggings, socks, shoes, under garments, and accessories (such as, but not limited to, hair-bands, wrist bands, head bands, finger bands, ankle bands, finger bands, toe-bands, arm bands, and shoe-laces).

The article to be decorated may have a single surface or a plurality of surfaces. Non-limiting examples of a single-surfaced article to be decorated are articles having one of a generally spherical, circular-donut, and elliptical-donut shapes. Non-limiting examples of article shapes having a plurality of article surfaces are articles substantially resembling one of a cube, rectangular-box and tetrahedral shapes.

Other Aspects of the Appliqué

Matching of the elastic properties of the various layers/films and article to be decorated can be done by any suitable technique. In one configuration, the modulus of elasticity for each layer and the article to be decorated is measured or otherwise determined. Trials are run at different moduli of elasticity combinations for the various materials to determine at which moduli of elasticity combinations the media begins to curl upwards. This represents an upper limit or threshold. These steps can be performed for other moduli of elasticity combinations or combinations of other elastic properties to determine the optimal materials to be selected for a given application.

Typically, the stretchable and elastic fiber material has elastic or elastomeric properties similar to (preferably within about 25%, even more preferably within about 15%, even more preferably within about 10%, and even more preferably within about 5% of the elastic properties (e.g., modulus of elasticity, elongation, and recovery) of the elastomeric adhesive layer 105, the first and second adhesive and elastomeric films, and the article to be decorated (e.g., relative to those set forth above for the first and second adhesive films 106 and 108, the elastomeric film 107, and/or elastomeric adhesive layer 105). By providing similar elastic properties in the various films and the stretchable and elastic fiber material itself, the appliqué media 3304 will not "curl up" as a result of uneven tension and will be substantially flat.

In another embodiment, the elastomeric properties of one or both of the first 106 and second 108 adhesive films are substantially independent of any discontinuities that may exist within either of the first 106 or second 108 adhesive films. The elastomeric properties of the first 106 and second 108 adhesive films are substantially due to the chemical and/ or physical properties of the adhesive materials respectively comprising the first 106 and second 108 adhesive films. That is, the first 106 and second 108 adhesive films are substantially elastomeric with or without discontinuities present within the first 106 and second 108 adhesive films.

Figure 3:
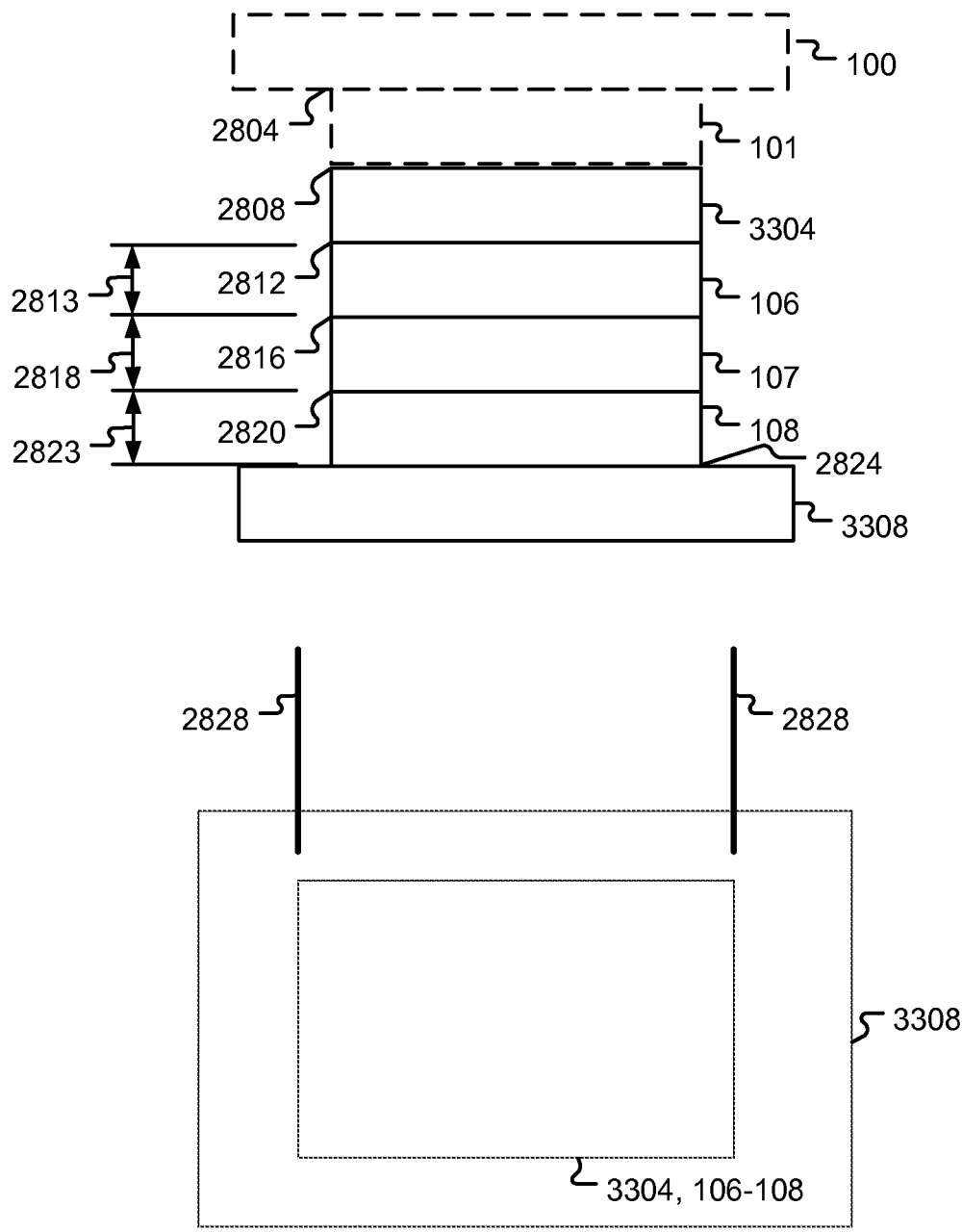
FIG. 3 depicts a cross-sectional and plan view of applique of FIG. 1.

Referring to FIG. 3, the elastomeric film 107 has an elastomeric film thickness 2818 and opposing upper 2816 and lower 2820 elastomeric interfaces. In a preferred embodiment, the elastomeric film 107 is substantially free of holes and/or voids, respectively, extending through the elastomeric thicknesses 2818. That is, the elastomeric film 107 is substantially continuously distributed and substantially free of holes and/or voids extending through its film thicknesses 2818 and throughout its areal extent 2800. Substantially free of holes and/or voids as used with reference to the elastomeric film 107 means that on a macroscopic level (that is, not a microscopic and/or molecular level) the elastomeric film thicknesses 2818 is greater than zero substantially over at least most, if not all, locations of the first and/or second areal extents. Stated another way, in preferred embodiment, the elastomeric film 107 has fewer than about 10, even more preferably, no more than about 5, and even more preferably, no more than about 1, and even more preferably, no holes and/or voids, visible holes and/or voids visible to an un-aided eye of ordinary human observer per square centimeter surface area of the first and/or second areal extents. In a more preferred embodiment, the elastomeric film 107 has no more than about 1 hole and/or void visible to an un-aided eye of ordinary human observer over the surface area of the first and/or second areal extents.

In another embodiment, the upper 2816 and lower 2820 elastomeric interfaces are substantially free of interfacial voids and/or valleys. That is, the upper 2816 and lower 2820 elastomeric interfaces are substantially planar and/or flat.

The first 106 and second 108 adhesive films are substantially continuously distributed over an areal extent of the substantially continuously distributed elastomeric film 107. Furthermore, the first adhesive film 106 is substantially continuously distributed over an areal extent of an interface between the first adhesive film 106 and the appliqué media 3304 to hold the appliqué media 3304 firmly in position. Moreover, the first 106 and second 108 adhesive films are substantially continuously distributed over their respective areal extents. The first 106 and second 108 adhesive films are substantially free of holes and/or voids over the areal extent of the first 106 and second 108 adhesive films.

FIG. 3 depicts a surface area defined by a first areal extent area of the first adhesive 106 in contact with the appliqué media 3304 and/or a surface area defined by a second areal extent of elastomeric film 107. Shown in FIG. 3 is an optional carrier sheet 100 and an optional release adhesive 101, when configured as a heat transfer.

The first 106 and second 108 adhesive films are, respectively, substantially continuously distributed over the first and second extents. Although the first and second areal extents are shown as being coterminous, this is not necessarily the case. The first and second areal extents can have differing sizes. In one embodiment, the first 106 and second 108 adhesive films are, respectively, substantially elastic and continuous over the first areal extent. In another embodiment, the first 106 and second adhesive films are, respectively elastic and continuous over the second areal extent.

The first adhesive film 106 has opposing upper 2812 and lower 2816 first adhesive interfaces and a first adhesive film thickness 2813. Furthermore the second adhesive film 108 has opposing upper 2820 and lower 2824 second adhesive interfaces and a second adhesive film thickness 2823. In a preferred embodiment, the first 106 and second 108 adhesive films are substantially free of holes and/or voids, respectively, extending through the first 2813 and second 2823 adhesive thicknesses. That is, the first 106 and second 108 adhesive films are substantially continuously distributed and substantially free of holes and/or voids extending through their respective (2813 and 2823) film thicknesses and throughout their areal extents 2800. Substantially free of holes and/or voids as used with reference to an adhesive film means that on a macroscopic level (that is, not a microscopic and/or molecular level) one or both of the first 106 and second 108 adhesive film thicknesses, respectively, 2813 and 2823 are respectively greater than zero substantially over at least most, if not all, locations of the first and/or second areal extents. Stated another way, in preferred embodiment, the first 106 and second 108 adhesive films, respectively, have fewer than about 10, even more preferably, no more than about 5, and even more preferably, no more than about 1, and even more preferably, no holes and/or voids, visible to an un-aided eye of ordinary human observer per square centimeter surface area of the first and/or second areal extent. In a more preferred embodiment, the first 106 and second 108 adhesive films each, respectively, have no more than about 1 hole and/or void visible to an un-aided eye of ordinary human observer over the surface area of the first and/or second areal extent.

In another embodiment, the upper 2812 and lower 2816 first adhesive interfaces are substantially free of interfacial voids and/or valleys. Furthermore, the upper 2820 and lower 2824 second adhesive interfaces are substantially free voids and/or valleys. That is, the upper 2812 and lower 2816 first adhesive interfaces are substantially planar and/or flat. Furthermore, the upper 2820 and lower 2824 second adhesive interfaces are substantially planar and/or flat.

In another configuration, the first 106 and/or second 108 adhesive films are not substantially continuously distributed over an areal extent of the substantially continuously distributed elastomeric film 107. Furthermore, the first adhesive film 106 can be substantially discontinuously distributed over an areal extent of an interface between the first adhesive film 106 and the appliqué media 3304 to hold the appliqué media 3304 firmly in position. Moreover, the first 106 and/or second 108 adhesive films are substantially discontinuously distributed over their respective areal extents. The first 106 and/or second 108 adhesive films comprise a plurality of holes and/or voids over the areal extent of the first 106 and second 108 adhesive films. The first 106 and/or second 108 adhesive films can, for example, be the lower second discontinuous adhesive film referenced in U.S. Pat. No. 7,410,682, to Abrams, which is incorporated fully herein by this reference. Using discontinuously distributed first and second adhesive films can make the applique or other design article breathable, or substantially permeable to air flow and provide benefits in the elasticity of the applique and/or other design article.

Appliqué Having Multiple Appliqué Media

Figure 27:
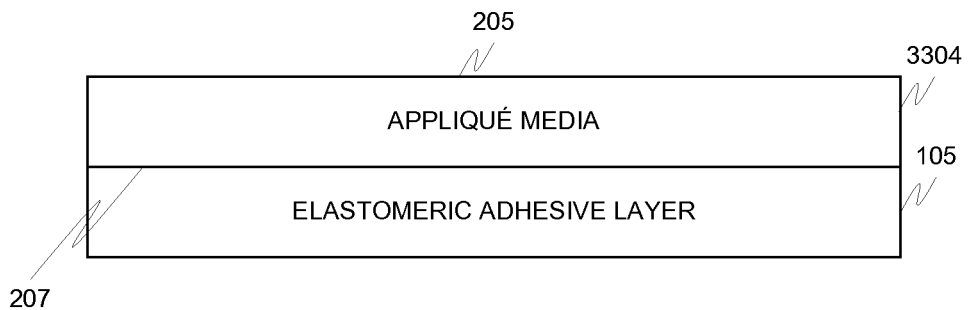
FIG. 27 depicts a side view of a textile product according to an embodiment.
Figure 28:
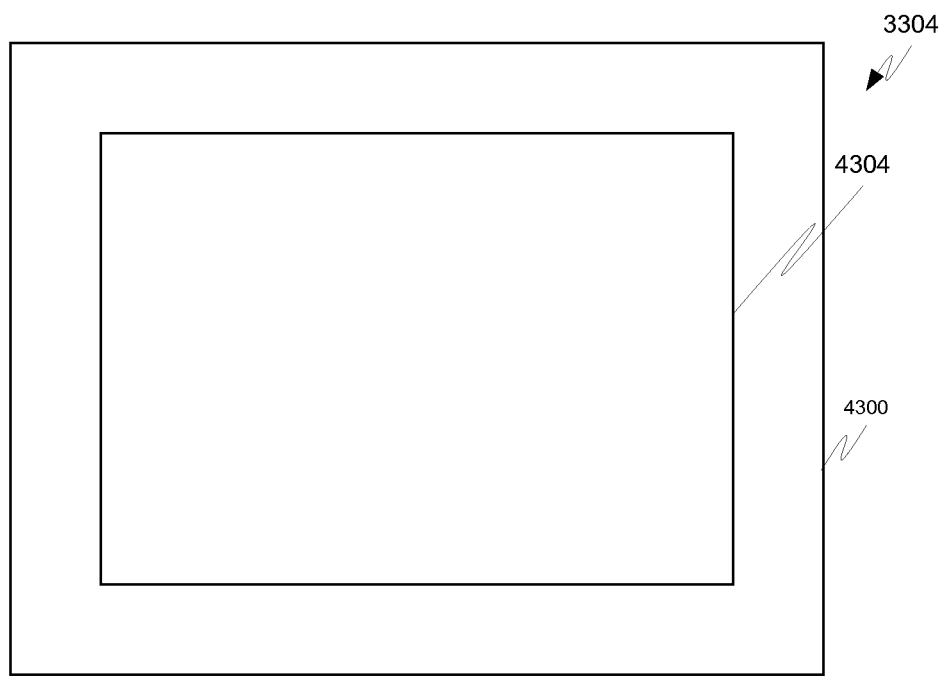
FIG. 28 depicts a top view of a textile product according to an embodiment.

In one configuration shown in FIGS. 27-28, the appliqué media 3304 is a combination of knitted textiles having different knit patterns or of woven and knitted textiles. The textile, whether knitted or knitted and woven, can further be sublimation printed, such as by sublimation dye heat transfer printing, to provide a mixed appliqué media creating the impression of a multi-dimensional image. For example, the textiles can be polyester textiles having one or more differing knit patterns (and/or pattern elements or parameters), knit constructions (or textures), weave patterns (and/or pattern elements or parameters), weave constructions, yarn weights (tex), wraps per inch, stitch or loop densities, lofts, hands, surface patterns, surface textures, tensions, yarn types and/or compositions (e.g., using yarns of differing light reflectivities, refractances, or reflectances such as a combination of dull (or diffused light) fibers to bright, lustrous, or shiny (or high gloss or highly light reflective or specular (mirror like)), and/or yarn distribution. The fibers are typically initially white, later sublimation printed with the printed design being in register with the different textiles and their respective design elements, and cut into different pieces corresponding to design elements. The design elements are logically selected based on the final design aesthetics. The logical elements can be selected to create a logical separation of the elements. Usually, the design portion to be emphasized is in the foreground and/or the design portion to be de-emphasized is in the background. In other words, the pieces are delineated or configured so that they collectively form an integrated design. For instance, a design with a circular ring of dull textile with a hole in the middle is later combined with a shiny printed inside circular textile piece. The sublimation dye transfer printed designs can be different for the differing pieces and correspond to portions of the completed design. As described elsewhere, the various design elements or pieces can be laminated together to form the multi-dimensional (e.g., heat applied) appliqué. The appliqué media can be used as an insert in a flock pattern or vice versa. The appliqué media 3304 can, individually and/or collectively, have a heat seal backing.

In one configuration shown in FIG. 27, the appliqué media 3304 is a combination of knit textiles having differing, (typically contrasting) knit patterns. The knit textile can further be sublimation printed, such as by sublimation dye heat transfer printing, to provide a mixed appliqué media creating the impression of a multi-dimensional image. For example, the textiles can be polyester textiles having one or more differing knit patterns (and/or pattern elements or parameters), yarn weights (tex), wraps per inch, stitch or loop densities, lofts, hands, surface patterns, surface textures, tensions, and/or yarn types and/or compositions (e.g., using yarns of differing light reflectivities, refractances, or reflectances such as a combination of dull (or diffused light) fibers to bright, lustrous, or shiny (or high gloss or highly light reflective or specular (mirror like)) fibers). The fibers are typically initially white, later sublimation printed with the printed design being in register with the different textiles and their respective design elements, and cut into different pieces corresponding to design elements. The design elements are logically selected based on the final design aesthetics. The logical elements can be selected to create a logical separation of the elements. Usually, the design portion to be emphasized is in the foreground and/or the design portion to be de-emphasized is in the background. In other words, the pieces are delineated or configured so that they collectively form an integrated design. For instance, a design with a circular ring of dull textile with a hole in the middle is later combined with a shiny printed inside circular textile piece. The sublimation dye transfer printed designs can be different for the differing pieces and correspond to portions of the completed design. As described elsewhere, the various design elements or pieces can be laminated together to form the multi-dimensional (e.g., heat applied) appliqué. The appliqué media can be used as an insert in a flock pattern or vice versa. The appliqué media 3304 can, individually and/or collectively, have a heat seal backing.

The appliqué media 3304 comprises a multi-colored printed design with or without simulated and/or textured embroidery stitching and is typically heat sealed to an article of clothing or substrate. The printing is preferably applied by sublimation printing techniques, before or after the appliqué media 3304 is adhered to one or more of the first adhesive film, elastomeric film, and/or second adhesive film. In one configuration, it is applied by sublimation printing techniques during lamination of one or more of the first adhesive film, elastomeric film, second adhesive film, and/or substrate to the appliqué media.

The textile pieces can be sublimation printed separately or after they are heat sealed together. In the former configuration, the textile pieces may be printed before or after they are cut out into their respective final shapes to be incorporated into the appliqué. Each of the textile pieces would have a portion of the final printed design.

One example will be discussed with reference to FIG. 28. In the example, the first textile piece 4300 can has fewer dull yarns per unit area and more shiny yarns per unit area than the second textile piece 4304. The knit patterns can be, for example, a herringbone pattern for the first textile piece 4300 and a stripe pattern for the second textile piece 4304. The first and second textile pieces have similar elastic and deformation recovery properties. Although the use of differing weave textiles is possible, it is preferred to use differing knitted textiles due to superior aesthetic appearance of knitted textiles as opposed to woven textiles.

Various constructions of the appliqués are possible.

Figure 5:
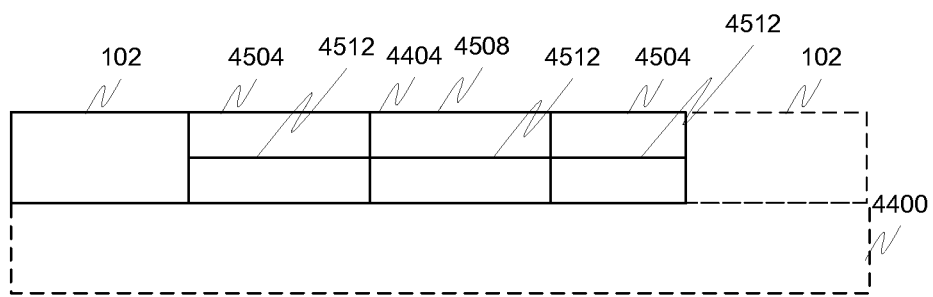
FIG. 5 depicts a side view of a textile product according to an embodiment.

With reference to FIG. 5, first and second textiles 4504 and 4508, respectively, have one or more differing properties as set forth above. Each of the first and second textiles 4504 and 4508 has a heat seal adhesive 4512 (which can be the same as the elastomeric adhesive layer 105), which acts to stabilize the textile and prevent unraveling, fraying, or runs in the knit during cutting of the textile. Accordingly, the heat seal adhesive is commonly applied before the textile is cut into the desired shape. The first textile 4504 and heat seal adhesive 4512 is heat laminated to the adhesive layer 4400. The second textile 4508 and its respective heat seal adhesive 4512 is positioned in a "window" or void space cut, by any of the techniques discussed herein, into the previously continuous first textile 4504 but not through the adhesive layer 4400. The second textile 4508, when positioned in the window, is heat laminated to adhere the heat seal adhesive 4512 to the adhesive layer 4400. In another configuration, the adhesive layer 4400 is absent. The heat seal adhesive 4512 is applied to the first and second textiles 4504 and 4508; the window is cut through the first textile 4504 and the respective heat seal adhesive 4512 underlying the first textile 4504, the second textile and its respective heat seal adhesive 4512 is positioned in the window and heat laminated to adhere the adjacent heat seal adhesives together. The product can optionally include flock 102. The adhesive layer 4400 is common to the first and second textiles 4504 and 4508 and optional flock 102. The heat seal adhesive 4512 and adhesive layer 4400 can be any of the thermoplastic or thermosetting adhesives discussed herein. In one configuration, the adhesive layer 4400 is the elastomeric adhesive layer 105. This arrangement provides an article having a substantially planar upper surface 4404. In one configuration, the flock fibers have a dull sheen and the first and second textiles 4504 and 4508 a shiny sheen, or vice versa, to produce an interesting visual effect.

The flock fibers 102, which can be diffusive (dull) or reflective (bright or shiny) have a flock fiber length and opposing first 103 and second 104 fiber ends. In one configuration, the first fiber ends 103 of the flock fibers 102 are embedded in the first adhesive film 106. The plurality of flock fibers 102 are adhered to the self-supporting, elastomeric adhesive layer 105 by the first fiber ends 102. Preferably, at least some of the flock fiber length is embedded in first adhesive film 106. More preferably, at least one of less than about 40%, 35%, 25%, 15%, 10%, 5%, and 3% of the fiber length is embedded in the first adhesive film 106 to preserve the soft touch of the flocked surface. It can be appreciated that, the fiber length embedded in the first adhesive film 106 depends on one or both the pressure applied to embed the flock fiber into the first adhesive film 106 and the first adhesive 106 physical properties during the embedding process. Typically, substantially the entire thickness of the first adhesive film flows into the flock fibers. The second fiber ends 104 of the flock fibers 102 are in contact with the release adhesive 101. The second fiber ends 104 of the plurality of flock fibers 102 are adhered to the first carrier sheet 100 by the release adhesive 101.

The plurality of flock fibers 102 may be formed from any natural or synthetic material. Synthetic material includes, without limitation, vinyl, rayons, nylons, polyamides, polyesters such as terephthalate polymers, such as poly(ethylene terephthalate) and poly(cyclohexylene-dimethylene terephthalate), and acrylic, and natural material includes cotton and wool. In one configuration, a conductive coating or finish is applied continuously or discontinuously over the exterior surface of the flock fibers 102 to permit the flock fibers 102 to retain an electrical charge. The flock fibers 102 may be pre-colored (yarn-dyed or spun dyed) before contacting one or both of the release adhesive 101 or the self-supporting, elastomeric adhesive layer 105 or after the first carrier sheet 100 is removed, such as by sublimation dye transfer printed.

Preferably at least most, and even more preferably at least about 75%, and even more preferably all, of the flock fibers 102 have a preferred denier of no more than about 60, more preferably no more than about 25, and even more preferably no more than about 5, with a range of from about 1.5 to about 3.5 being typical and have a titre ranging from about 0.5 to about 20 Dtex (from about 0.5 to about $20 \times 10^{-7}$ Kg/m) and even more preferably from about 0.9 Dtex to about 6 Dtex. The length of at least most, and typically at least about 75%, of the flock fibers 102 is preferably no more than about 4 mm, more preferably no more than about 2 mm, and even more preferably no more than about 1 mm, with a range of from about 0.3 to about 3.5 mm being typical. The flock fiber placement density relative to the surface area of the flocked portion (on which the flock is deposited) of the media product is preferably about 50% fibers/in$^2$, even more preferably at least about 60% fibers/in$^2$, and even more preferably at least about 70% fibers/in$^2$ of the flocked surface area.

Figure 6:
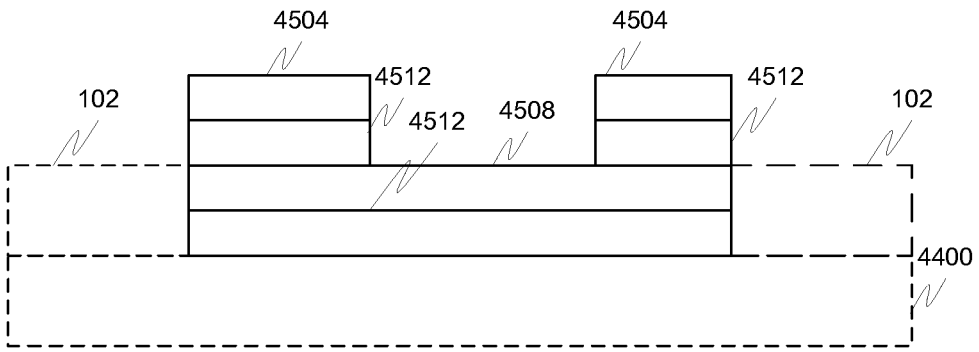
FIG. 6 depicts a side view of a textile product according to an embodiment.

With reference to FIG. 6, the first textile 4504 is mounted on top of the second textile 4508. The heat seal adhesives 4512 corresponding to the first textiles 4504 are adhered to the upper surface of the second textile 4508. The heat seal layer 4512 is optionally adhered to an adhesive layer 400, which optionally may be adhered to flock 102 adjacent to a perimeter edge of the second textile 4508 and heat seal adhesive 4512. This arrangement provides an article having a substantially nonplanar upper surface.

Figure 7:
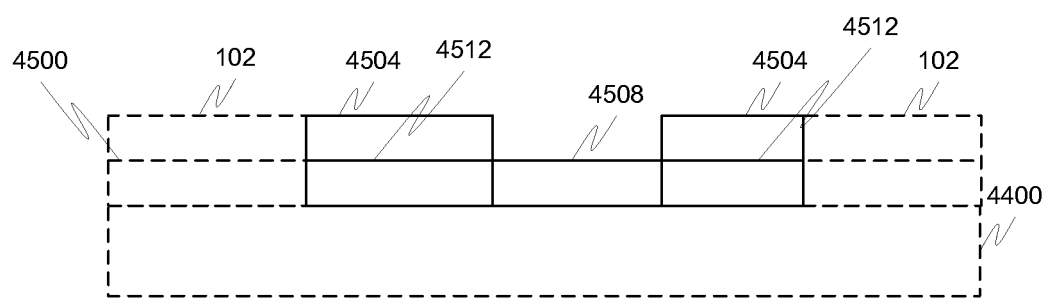
FIG. 7 depicts a side view of a textile product according to an embodiment.

With reference to FIG. 7, the first textiles 4504 are mounted adjacent to second textile 4508. Stated another way, the first textiles 4504 are mounted in a cut out or cut away portion of the second textile 4508. The heat seal adhesives underlying the first textiles 4504 engage the adhesive layer 4400. The adhesive layer 4400 acts as the heat seal adhesive for the second textile 4508. Optionally, flock 102 and an adhesive 4500 (which can be any of the adhesives discussed herein) engage the adhesive layer 4400. This arrangement provides an article having a substantially non-planar upper surface.

Figure 8:
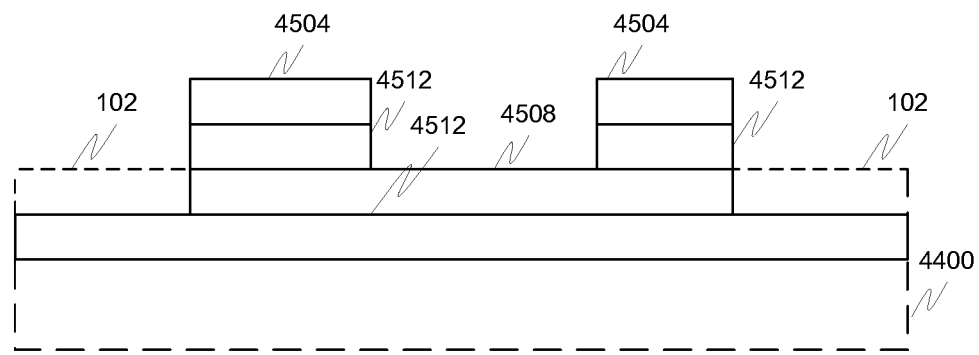
FIG. 8 depicts a side view of a textile product according to an embodiment.

With reference to FIG. 8, the first textiles 4504 and corresponding heat seal adhesives 4512 are adhered to an upper surface of the second textile 4508, which in turn is adhered to a heat seal adhesive 4512. The heat seal adhesive 4512 is, in turn, optionally adhered to the adhesive layer 4400. Flock 102 may optionally be adhered to the heat seal adhesive 4512 underlying the second textile 4508. This arrangement provides an article having a substantially nonplanar upper surface.

Figure 9:
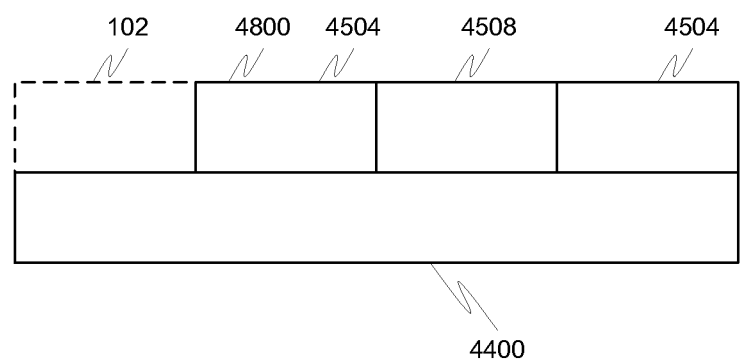
FIG. 9 depicts a side view of a textile product according to an embodiment.

With reference to FIG. 9, the first and second textiles 4504 and 4508 and optional flock 102 are positioned side-by-side as shown and adhered directly to a common adhesive layer 4400. This arrangement provides an article having a substantially planar upper surface 4800.

The first and second textiles 4504 and 4508 can be pre-shrunk before sublimation printing to inhibit shrinkage during sublimation. Commonly, due to the pre-shrinkage the dimensions knit pattern of the first and second textiles change less than about 25%, more commonly less than about 10%, and even more commonly less than about 5% during sublimation printing relative to the same dimension before sublimation printing.

Methods of Manufacturing a Textile Products, Particularly Appliqués

Figure 10:
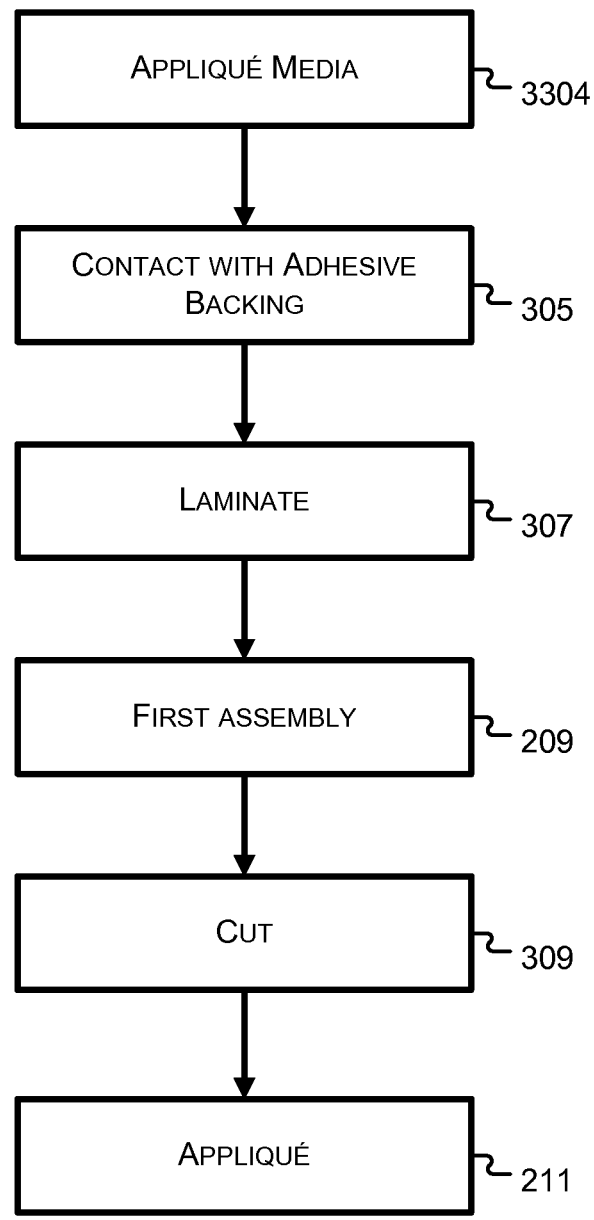
FIG. 10 depicts a process for making a textile product according to an embodiment of the present disclosure.
Figure 11:
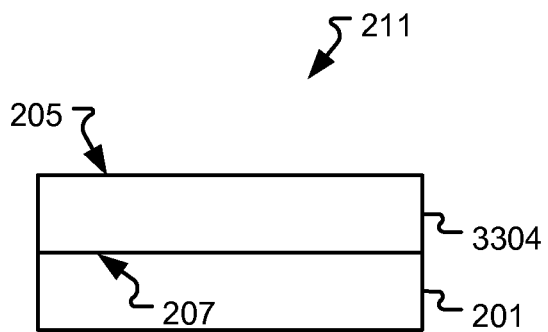
FIG. 11 is a cross-sectional view of view of a textile product according to the process depicted in FIG. 10.
Figure 12:
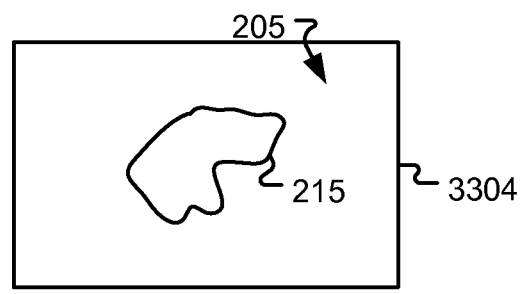
FIG. 12 is a plane view of a textile product according to the process depicted in FIG. 11.

FIG. 10 depicts a method of preparing an appliqué media 3304 in the form of an appliqué 211 (FIGS. 11 and 12).

Preferably, the appliqué media 3304 comprises a stretchable, elastic, and/or elastomeric textile. The appliqué media 3304 may comprise one or more of a stretchable, elastic, and/or elastomeric polymer, fiber, weave, knit, or combination thereof. Preferably, the weave comprises a stretchable, elastic, and/or elastomeric weave. Preferably, the appliqué media 3304 contains a graphic design image 215.

In one configuration, the graphic design image 215 is incorporated into the weave or knit of the appliqué media 3304. As will be appreciated, the appliqué media 3304 may be a non-woven textile, such as a knitted textile material. The appliqué media 3304 has first 205 and second 207 opposing textile surfaces, and the graphic design image 215 is at least contained within the weave or knit of the first textile surface 205.

Weaving or knitting the graphic design image 215 into the appliqué media 3304 using dyed yarns eliminates the need to print the graphic design image 215 on the textile, reducing and/or eliminating a step of printing an image on the textile. Additionally, having a graphic design image 215 within the weave of the appliqué media 3304 or within the knit of a knitted textile creates a unique artistic element to the graphic design image 215. The artistic quality and beauty of the woven graphic design image 215 generally surpasses the artistic quality and beauty of a similarly printed image. In can be appreciated that, the graphic design image 215, may be woven in a single hue, value of a single hue, or differing hues and/or values.

In another embodiment, the design image is printed, such as by sublimation printing techniques, onto the appliqué media 3304 (which is typically composed of yarns, threads, or fibers of a common color (typically white)). The appliqué media 3304 comprises a multi-colored printed design, with or without simulated and/or textured embroidery stitching, and is typically heat sealed to an article of clothing or article to be decorated. The printing is preferably applied by sublimation printing techniques, before or after the appliqué media 3304 is adhered to one or more of the first adhesive film, elastomeric film, and/or second adhesive film. In one configuration, it is applied by sublimation printing techniques during lamination of one or more of the first adhesive film, elastomeric film, second adhesive film, and/or article to be decorated to the appliqué media.

When multiple textiles are incorporated as design elements in the design, the textile pieces can be sublimation printed separately or after they are heat sealed together. In the former configuration, the textile pieces may be printed before or after they are cut out into their respective final shapes to be incorporated into the appliqué. Each of the textile pieces would have a portion of the final printed design 3304.

Any sublimation printing technique may be employed. Examples of sublimation printing techniques include a dye-sublimation (heat) transfer (in which a heat transfer image is placed on the appliqué media and the dye thermally transferred to the appliqué media), dye-sublimation printer, and the like. Sublimation printing commonly occurs at elevated temperature, such as higher than about 275° F. and even more typically higher than about 350° F., which is normally above the melting point of the first adhesive film 106, elastomeric film 107, and/or second adhesive film 108. The carrier sheet 3308 controls the flow of the melted first adhesive film 108. The elastomeric film 107 and second adhesive film 108 are typically adhered to the first adhesive film 107 after sublimation printing to avoid melting the films so that they flow together, thereby adversely impacting, or even destroying, the elastomeric properties of the elastomeric adhesive layer 105. Although aspects of the disclosure are described with reference to sublimation printing, it will be appreciated that any process suitable for imparting colors (e.g., dye, pigment, and/or ink) to fabric or textiles may be employed in addition to or in lieu of sublimation printing, such as direct screen printing, gravure, offset, rotary, lithography, ink jet, thermal, and stereolithography.

In step 305, an elastomeric adhesive backing 201 is contacted with the appliqué media 3304. In a preferred embodiment, the elastomeric adhesive backing 201 comprises the self-supporting, elastomeric layer 105. The elastomeric adhesive backing 201 is positioned adjacent to the second textile surface 207. Preferably, the elastomeric adhesive backing 201 is adhered to the second textile surface 207 by the first adhesive film 106.

In step 307, the elastomeric adhesive backing 201 is laminated to the appliqué media 3304 to form a first textile assembly 209, thereby securing the appliqué media 3304 to the elastomeric adhesive backing 201. Heat and/or pressure are applied during the laminating process. Preferably, the laminating step 307 includes, before, after, or substantially simultaneously, applying one or both of heat and pressure. The applied heat is sufficient to adhesively bond the appliqué media 3304 to the elastomeric adhesive backing 201. That is, when the elastomeric adhesive backing comprises the self-supporting, elastomeric adhesive layer 105, the applied heat is sufficient to adhesively bond the appliqué media 3304 to the first adhesive film 106 of the self-supporting, elastomeric adhesive layer 105. Moreover, the applied heat at least softens and/or partially melts the first adhesive film 106, or the elastomeric adhesive backing 201, to adhere the appliqué media 3304 to the self-supporting, elastomeric adhesive layer 105, or the elastomeric adhesive backing 201.

The temperature and pressure required to soften the first adhesive film 106 depends on the chemical properties of the adhesive. Preferably, substantially enough heat is applied to at least soften, if not at least partially melt, the first adhesive film 106. While not wanting to be bound by any theory, it is believed that embedding part of the appliqué media 3304 of the first fiber ends 103 into the first adhesive film 106 substantially adhesively bonds the media to the first adhesive film 106 by one or more of the following adhesive processes: mechanical, electrostatic, adsorption, chemisorption, diffusion, or a combination thereof. The pressure is at least sufficient to substantially mechanically interlock the elastomeric adhesive backing 201 with the appliqué media 3304, more specifically to at least sufficiently mechanically interlock the first adhesive film 106 with the appliqué media 3304. The pressure, however, should not be too high to avoid pushing the first (or second) adhesive too far into and possibly through to the other side of the appliqué media (or article to be decorated).

In an embodiment, the first adhesive film 106 softens and/or fully or partially melts at a first adhesive film temperature from about 50° C. to about 140° C. Preferably, the first adhesive film temperature is from about 60° C. to about 120° C. and even more preferably from about 65° C. to about 100° C. More preferably, the first adhesive film softens and/or fully or partially melts at the first adhesive film temperature of from about 65 to about 100° C. Even more preferably, the first adhesive film softens and/or fully or partially melts at the first adhesive film temperature from about 75° C. to about 85° C. Stated another way, a process line temperature from about 100° C. to about 300° C. may provide sufficient heat to sufficiently soften and/or partially melt the first adhesive film 106. Preferably, the process line temperature is from about 175° C. to about 275° C. More preferably, the process line temperature to at least sufficiently soften and/or partially melt the first adhesive film 106 is from about 200° C. to about 250° C. A process line temperature means the temperature applied during at least the applying of heat.

In an embodiment, the pressure applied to embed the appliqué media ends into the first adhesive film 106 is preferably from about 0.1 bar to about 10 bar, more preferably from about 0.5 bar to about 5 bar, more preferably from about 0.7 to about 4.5 bar, more preferably, from about 0.7 bar to about 4.0 bar, and even more preferably from about 0.7 bar to about 3 bar.

In one embodiment, the elastomeric adhesive backing 201 is laminated to a web 221 to form a laminated web 220. The elastomeric adhesive backing 201 is contacted with the web 221 before individual design images 215 are cut from the web 221.

The elastomeric adhesive backing 201 adds stability to the first textile assembly 205 and keeps the first textile assembly 205 substantially flat and substantially dimensionally stable. Without the elastomeric adhesive backing 201, the appliqué media 3304 substantially lacks sufficient stability and is difficult to keep flat to align the graphic design image 215 in registration for further processing, such as, cutting for an use as an insert and/or appliqué. Manually aligning a textile lacking sufficient dimensional stability is difficult, consumes time, and adds cost. The elastomeric adhesive backing adhesive 201 provides sufficient stability and/or rigidity to the first textile assembly 205, such that the first textile assembly 205 can to be aligned by a machine for further processing, such as, cutting for an insert and/or appliqué. The appliqué media 3304 without the elastomeric adhesive backing adhesive 201 substantially lacks stability for machine alignment. Additionally, the elastomeric adhesive backing 201 maintains the appliqué media 3304 in a substantially flat, wrinkle-free condition after the appliqué media 3304 is laundered.

An important aspect to consider is the thermally induced shrinkage of the appliqué media 3304. Normally, the appliqué media 3304 thermally shrinks, with the amount of shrinkage depending upon the length of time the appliqué media 3304 is maintained at a given temperature. At least two techniques can be used singly or collectively to compensate for thermal shrinkage. In one technique, the appliqué media 3304 is heated to at least the maximum temperature to be experienced during lamination, and, optionally, in later processing steps.

The appliqué media 3304 is held at the selected temperature for a time sufficient for the material to thermally shrink. The heat is then removed, and the appliqué media 3304 cools. During cooling, the appliqué media 3304 weave or knit relaxes. The thermally shrunk appliqué media 3304 is then subjected to the lamination process of applying the elastomeric adhesive backing 201 thereto. The appliqué media 3304 may shrink by as much as 20% or more, depending on the applied temperature and the yarn composition and/or weave and/or knit.

In another technique, the pressure applied to the appliqué media 3304 during lamination is sufficiently high to inhibit substantially textile shrinkage. Preferably, the pressure applied during the lamination is at least about 10 psi, more preferably at least about 12 psi, and even more preferably ranges from about 12 to about 50 psi. Stated another way, the pressure applied by the platen to the appliqué media 3304 is preferably at least about 1 psi and even more preferably at least about 1.4 psi. Under these pressures, the dimensions of the appliqué media 3304 commonly shrink no more than about 5% and even more commonly no more than about 2.5%. After lamination, the elastomeric adhesive backing 201 maintains substantially the dimensions of the appliqué media 3304 and design image 215.

In step 309, the first textile assembly 205 is cut, by any suitable technique, to form an appliqué 211. In one configuration, the first textile assembly 205 is cut in registration with the graphic design image 215. The cutting process may be any suitable cutting device known to a person of ordinary skill within the art, such as a steel-rule dies, hard tool metal dies, laser cutter, ultrasound cutter, high frequency cutter, hot-wire cutter, or water jet cutter. Preferably, the cutting process is one of laser or die cutting process. The cutting process may also include an ablation process to improve adhesion of the textile 203 in subsequent processing. Particularly preferred laser cutting and/or ablation processes are disclosed in U.S. application Ser. No. 11/874,146 to Abrams which is incorporated in its entirety herein by this reference.

Laser cutting is preferred in applications where discoloration is not an issue. While laser cutting can seal and/or fuse the edges, extending the useful area of the appliqué 211 to include the sealed and/or fused edges, it can also causing discoloration (e.g., yellowing) of the textile edge due to the condensation of the vaporized material from the cutting/fusing of the laser. In other words, the laser cutting can fuse the yarns comprising the cut-edges of appliqué 211. The fused-edge yarns do not "pop-up" or fray, as do die-cut yarn edges. Die-cut edges typically have long loose yarns, such as "float" yarns on the surface which "pop up" and are easily and quickly frayed. While not wanting to be bound by any theory, one or more fused-edge yarns and the adhesive melt during the laser cutting to form the fused edge. Typically, the appearance of the cut fused-edge has a "beaded-like" appearance. It can be appreciated that, for some applications and designs frayed edges are preferred, such as, designs that have a worn, more casual, and/or more vogue appearance. The fused-edge yarns stay-in place, are more durable and more highly valued by consumers.

The laser power and speed of the cutting process commonly affect the degree that cut-edge yarns are fused. For example, low laser power and/or fast cutting speed decrease the degree to which the cut-edge is fused. Optimal fused-edges typically require a balancing of the laser power and line speed to properly fuse most, if not all, of the edge yarns and minimize, or eliminate, "pop-up" or frayed edge yarns. The fused-edges of the appliqué 3300 can allow higher processing line speeds.

While it is true that die-cut edges typically have long loose yarns, such as "float" yarns on the surface which "pop up" and are easily and quickly frayed, it has been surprisingly discovered that die-cutting the product of the present disclosure does not produce this result. The die-cut edge yarns stay-in place, are more durable and more highly valued by consumers. It can be appreciated that, for some applications and designs frayed edges are preferred, such as, designs that have a worn, more casual, and/or more vogue appearance. The die cut-edges of the appliqué 211 also allow higher processing line speeds. While not wishing to be bound by any theory, it appears that edge fibers are fused to some extent by being heated during heat sealing of the first adhesive layer to the appliqué media 3304.

In one implementation, cutting is performed by a cutting machine having an optical element to identify a selected reference point in each design image. The reference point may be identified optically, for example, using reflected laser light in a conventional laser light registration system, as known by those of skill in the art. Optical registration is preferred over using a guide side of the cut out insert (or a prior cut line) because some materials lack sufficient dimensionality to use an edge for registration. Once the desired reference point is identified, the cutting element cuts out the design image using programmed logic to impart accurate registration and to precisely cut out the design image 215. In this manner, the design image 215 is cut to the desired size and shape. Also, the design elements of the design image 215 are registered relative to the cut lines. It can be appreciated that, one of the artistic design elements is the relationship of the cut lines with the design image 215.

Figure 13:
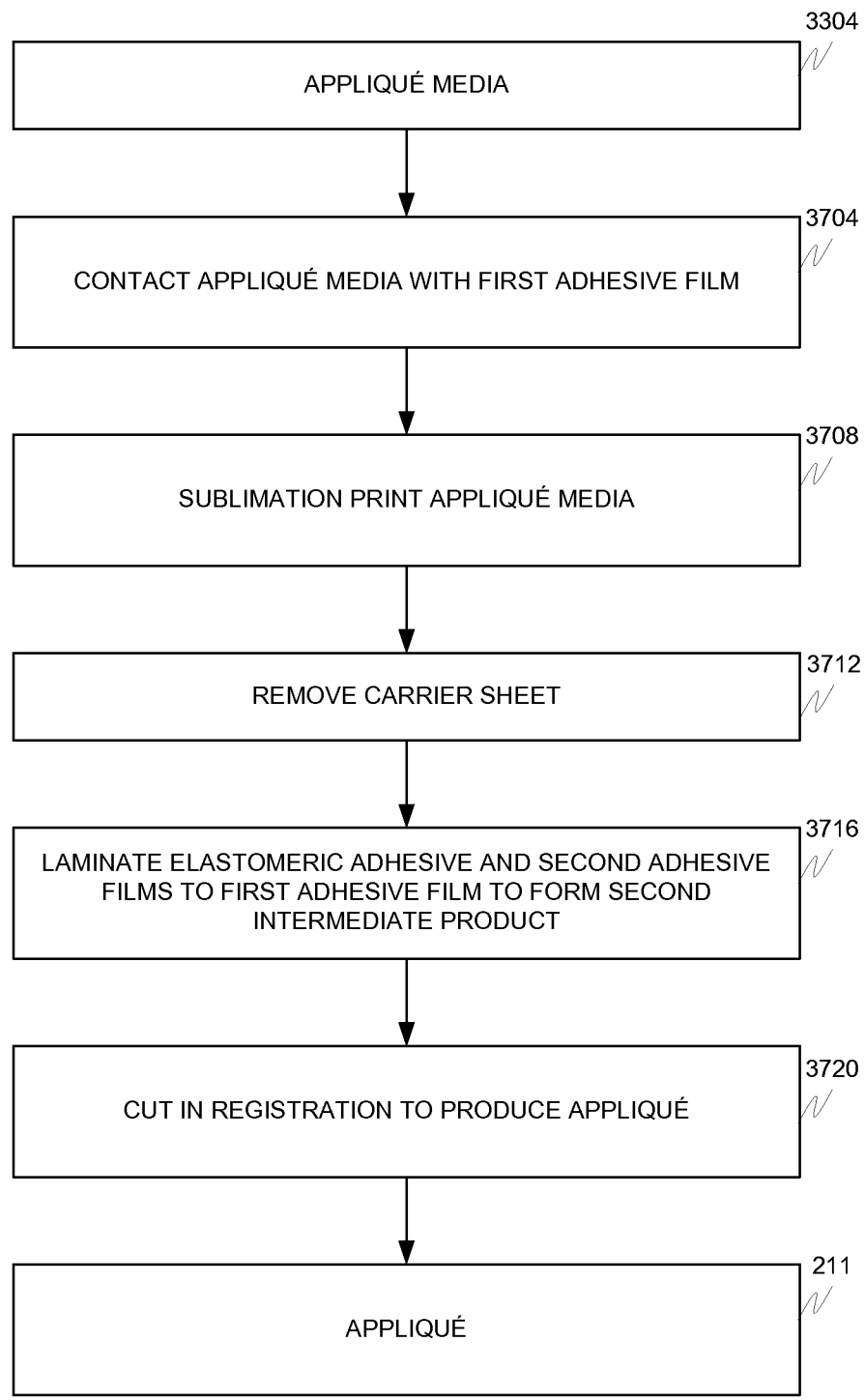
FIG. 13 depicts a manufacturing process according to an embodiment.
Figure 14:
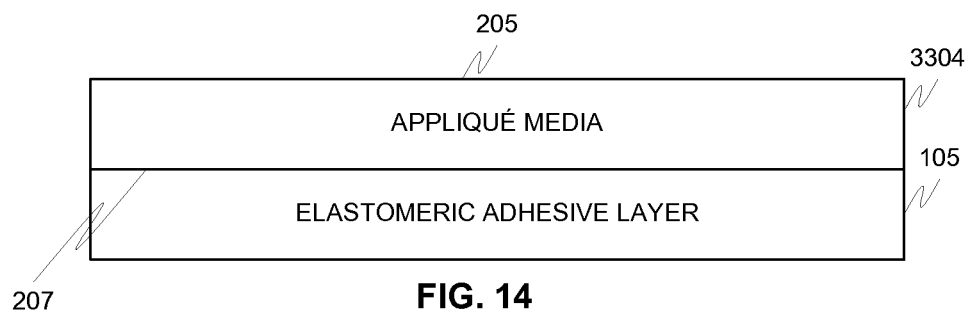
FIG. 14 depicts an applique according to an embodiment.
Figure 15:
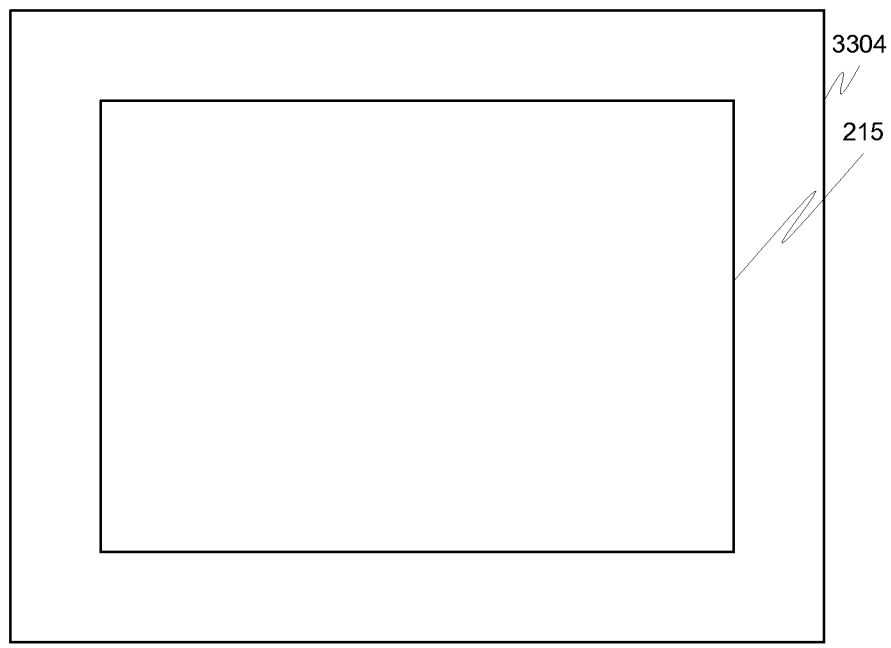
FIG. 15 depicts a textile product according to an embodiment.

FIG. 13 depicts a method of preparing an appliqué 3300 (FIGS. 14 and 15).

The appliqué media 3304 has first 205 and second 207 opposing media surfaces. The design image is printed, such as by sublimation printing techniques, onto the first media surface 205 of the appliqué media 3304. The elastomeric adhesive layer 105 is positioned adjacent to the second media surface 207. Preferably, the elastomeric adhesive layer 105 is adhered to the second media surface 207 by the first adhesive film 106.

Figure 29:
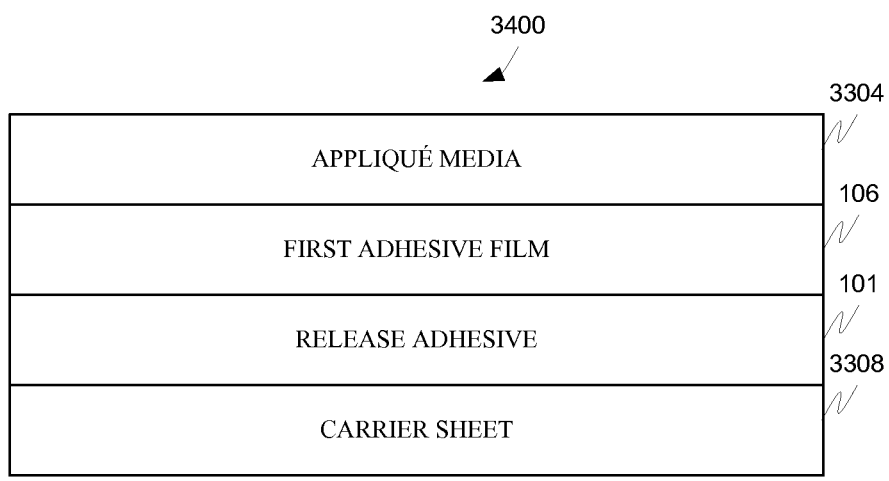
FIG. 29 depicts an intermediate product according to an embodiment.

The appliqué media 3304, in step 3704, is optionally contacted with the first adhesive film 106. The first adhesive film 106 is attached, by the release adhesive 101, to the carrier sheet 3308 to produce the intermediate product 3400 shown in FIG. 29.

In step 3708, the appliqué media 3304 in the intermediate product 3400 is sublimation printed using a low, medium, or high energy dye. In step 3708, the temperature of sublimation printing is preferably at least about 375° F. and even more preferably at least about 400° F. and is more than the melting temperature of the first adhesive film 106. Because of the presence of the carrier sheet 3308, one can use a sublimation printing temperature above the melting point of the first adhesive film 106. Typically, the sublimation printing temperature is above the softening point of the first adhesive film 106. The first adhesive film and attached carrier sheet stabilize the intermediate product 3400 during sublimation printing and maintain it substantially flat and substantially dimensionally stable. In an alternative embodiment, the appliqué media 3304 can be sublimation printed before the first adhesive film 106 is contacted therewith. In that even, the first and second adhesive films 106 and 108 and elastomeric film 107 are applied at a lower temperature in a subsequent step. In another embodiment, the sublimation printing step may be conducted after the lamination step 3716.

In step 3712, the release adhesive 101 and carrier sheet 3308 are removed, after cooling, from the first adhesive film 106 (if applied before step 3708). In one process configuration, the first adhesive film 106 is not applied before step 3708 but after step 3708.

In step 3716, the elastomeric film 107 and optionally first and second adhesive film(s) 106 and 108 elastomeric adhesive layer 105 is/are laminated, at a temperature less than the sublimation printing temperature and the softening and melting temperatures of the elastomeric film (and optionally the first adhesive film) but above the softening and melting temperatures of the second adhesive film (and optionally the first adhesive film), to the appliqué media 3304 to form a second intermediate product having the same cross-section as FIG. 1. Heat and/or pressure are applied during the laminating process. In one configuration, the applied heat is sufficient to adhesively bond the appliqué media 3304 to the elastomeric adhesive layer 105 and is preferably above the softening point but below the melting point of the elastomeric film 107. The lamination temperature, in this configuration, is typically less than about 350, even more typically less than about 325, and even more typically less than about 275° F. or below the temperature at which the various films of the elastomeric adhesive layer 105 melt and fuse together. In another configuration, the applied heat is above the melting point of one or more films of the elastomeric adhesive layer 105 to adhesively bond the first adhesive film 106 to the elastomeric film 107. The applied heat at least softens and/or partially melts the first adhesive film 106 to adhere the first adhesive film 106 to the elastomeric film 107. The temperature required to soften the first adhesive film 106 depends on the chemical properties of the adhesive. The pressure is at least sufficient to substantially mechanically interlock the first adhesive film 106 with the elastomeric film 107, as appropriate, to at least sufficiently mechanically interlock the appliqué media 3304 with the elastomeric film 107.

In step 3716, the second intermediate product is cut in registration with a design pattern, which can be the same as the design image 215, to form the applique 3300. The cutting is preferably done using registration or fiducial marks printed on the appliqué media 3304. The cutting process may be any cutting process as discussed above. Preferably, the cutting process is one of laser or die cutting process. The cutting process may also include an ablation process to improve adhesion of the applique 3304 in subsequent processing. Particularly preferred laser cutting and/or ablation processes are disclosed in U.S. application Ser. No. 11/874,146 to Abrams which is incorporated in its entirety herein by this reference.

The second adhesive of the appliqué 3300 may be contacted in registration with and attached to an article to be decorated, during or after the process of FIG. 13. The registration process may be a mechanical and/or electro-optical guided registration process. In one technique, the appliqué 3300 is heat sealed to the article to be decorated at a temperature no greater than the temperature at which the elastomeric adhesive layer 105 is applied to the appliqué media 3304.

Preferably, substantially enough heat is applied to at least soften, if not at least partially melt, the second adhesive film 108. While not wanting to be bound by any theory, it is believed that for the second adhesive film 108 to substantially and/or permanently adhere to the article to be decorated, the second adhesive film 108 should be sufficiently softened and/or partially melted to at least flow and/or wet the article to be decorated. Furthermore, it is believed the flowing and/or wetting of the article to be decorated by the softened and/or partially melted second adhesive film 108 substantially, permanently binds the second adhesive film 108 to the article to be decorated by one or more of the following adhesion processes: mechanical, electrostatic, adsorption, chemisorption, diffusion, or a combination thereof. Preferably, the second adhesive film 108 is permanently adhered to the article to be decorated by at least some, if not mostly, a mechanical adhesive process.

To maintain the elasticity of both the appliqué media 3304 and article to be decorated, the glue line or bond line normally requires careful control. The "glue line" or "bond line" is the solid layer of adhesive that provides the actual attachment of an adhesive layer, such as the first or second adhesive layer, with the adjacent layer, such as the appliqué media 3304 or article to be decorated, respectively. Control of the glue line or bond line is effected by controlling the interdependent variables of dwell time during heat setting, platen pressure applied to the appliqué media 3304 during heat setting, and heat setting temperature (or temperature of the adhesive layer). Permitting the glue line or bond line to penetrate too far into an elastic material can destroy or detrimentally impair the material's elasticity by filling inter-fiber spaces with adhesive and preventing fiber deformation. As will be appreciated, threads in a knit or woven textile "move" (in response to stretch forces) within a two-dimensional plane. In an unstretched condition, the threads can have the shape of a circle and in the stretched condition of an elongated ellipse. When the threads are completely embedded within the adhesive, the adhesive contained within the region of the circle will impede the thread's forming of the stretched elipse. However, when the threads are adhered to adhesive but sit on top of the adhesive, the adhesive and threads stretch together and the adhesive contained within the circle can more easily distort (stretch) to fill the region contained within the elipse.

Preferably, the glue line or bond line penetrates no more than about 50% of the thickness of the adjacent elastic layer (whether the appliqué media or article to be decorated), even more preferably no more than about 35%, even more preferably no more than about 25% of the thickness, and even more preferably no more than about 10% of the thickness. In one application, the glue line or bond line does not penetrate preferably more than about 5 mm, even more preferably not more than about 1 mm, even more preferably not more than about 0.5 mm, even more preferably not more than about 0.05 mm, and even more preferably not more than about 0.01 mm into the adjacent appliqué media or article to be decorated. During processing, it is preferred that the glue line temperature be at or above the softening and/or melting temperature of the first and second adhesives but below the softening and/or melting points of the elastomeric layer. If the three layers melt, the elastomeric properties of the elastomeric layer will be detrimentally impacted—and even destroyed in cases of substantial intermixing of the layers. During manufacture of the appliqué alone or lamination of the appliqué to the article to be decorated, the glue line temperature, or the temperature required to yield the desired degree of penetration in the textile matrix of either the appliqué media or article to be decorated, preferably ranges from about 75 to about 350° C., more preferably from about 100 to about 300° C., and even more preferably from about 110 to about 250° C. The preferred belt speed of the laminating machine ranges from about 1.5 to about 2 m/min.

To maintain a sufficiently strong bond between the second adhesive film and the article to be decorated without too much penetration of the adhesive into the fabric of the article to be decorated, the platen pressure can be important. For a Hix™ brand pneumatic lamination machine, the preferred line pressure setting is at least about 50 psi, even more preferably from about 50 to about 75 psi, and even more preferably from about 50 to about 60 psi. The line pressure is a relative number and must be converted to direct applied pressure or "surface" pressure of the platen according to a formula known to those of ordinary skill in the art. The formula combines the line pressure, area of the heat press, and cylinder diameter and stroke of the machine. After the conversion, the direct surface applied pressure is preferably at least about 6 psi, even more preferably ranges from about 6 psi to about 15 psi, and even more preferably from about 6 psi to about 7.5 psi. The preferred residence or dwell time of a given segment of the elastomeric adhesive layer at these pressures preferably ranges from about 5 to about 50 seconds, even more preferably from about 7.5 to about 35 seconds, and even more preferably from about 10 to about 30 seconds.

In still yet another embodiment, second adhesive film 108 may be heated and contacted with the article to be decorated prior to the application of pressure. One of skill in the art would appreciate that other combinations of contacting and applying heat and/or pressure are possible for adhering the second adhesive film 106 to the article to be decorated.

In yet another embodiment, the appliqué media 2204, article to be decorated 112, and self-supporting, elastomeric adhesive layer 105 are contacted substantially simultaneously, preferably substantially simultaneously in registration.

For higher volumes requiring low cost and high scalability, the appliqué can be run in a wide-width format. Dimensional stability of the printed images, so it can be subsequently registered, for example, to a cutting die or molding tool, can be maintained by use of a continuous web production line, which holds material under tension, thereby enabling precise positioning of the material for each step of processing, assisted possibly with machine vision.

Figure 30:
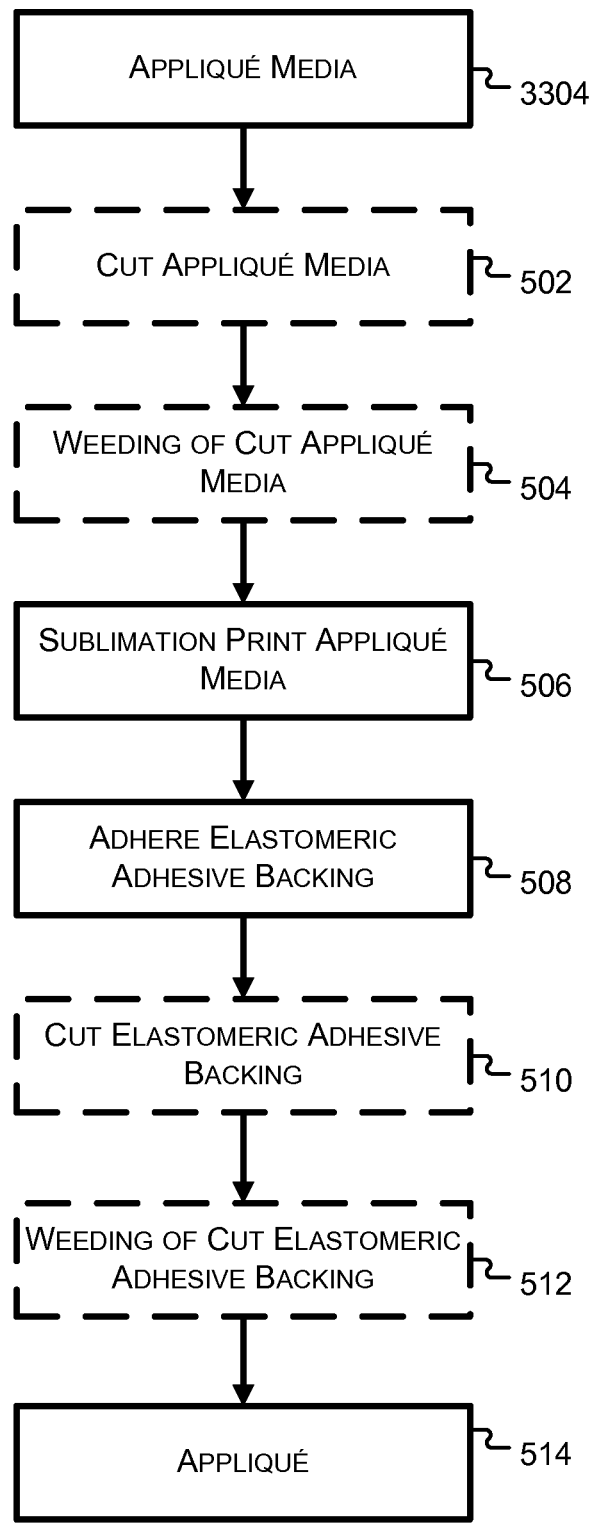
FIG. 30 depicts a method of preparing an appliqué according to an embodiment.

FIG. 30 depicts a method of preparing an appliqué 514 according to one embodiment. The method begins with optional step 502 in which an appliqué media 3304 is cut.

The cutting process in optional step 502 is performed to cut out the appliqué media into a final shape to be incorporated into the appliqué 514. The cutting process may be performed using any suitable cutting device known to a person of ordinary skill within the art.

At optional step 504, weeding of the cut appliqué media is performed. The weeding process involves removing the excess appliqué media that is not part of the final shape. The weeding may be performed manually by a person using tools, for example a razor blade or other appropriate device, for removing the excess appliqué media while maintaining the appliqué media of the final shape. In some embodiments, the weeding at step 504 may be automatically performed using a programmed machine instead of manually by a person.

After step 504, the cut and weeded appliqué media is sublimation printed using a low, medium, or high energy dye at step 506. In step 506, the temperature of sublimation printing is preferably at least about 375° F. and even more preferably at least about 400° F. The sublimation printing temperature may be selected independent of the properties of the elastomeric adhesive backing, because it has not yet been adhered to the appliqué media. Accordingly, in embodiments, the sublimation printing temperature may be above or below the melting point of the first adhesive film 106 and/or the second adhesive film 108 (FIG. 3).

In step 508, the elastomeric adhesive backing is adhered to the cut appliqué media so that the cut appliqué media is secured to the elastomeric adhesive backing, e.g., 201 (FIG. 11). Heat and/or pressure are applied during the step 508. Preferably, step 508 includes, before, after, or substantially simultaneously, applying one or both of heat and pressure.

The applied heat is sufficient to adhesively bond the cut and weeded appliqué media to the elastomeric adhesive layer. That is, when the elastomeric adhesive backing comprises the self-supporting, elastomeric adhesive layer 105 (FIG. 1), the applied heat is sufficient to adhesively bond the appliqué media 3304 to the first adhesive film 106 of the self-supporting, elastomeric adhesive layer 105. Moreover, the applied heat at least softens and/or partially melts the first adhesive film 106, or the elastomeric adhesive backing 201, to adhere the appliqué media 3304 to the self-supporting, elastomeric adhesive layer 105, or the elastomeric adhesive backing 201.

The temperature and pressure used in step 508 depends on the chemical properties of the adhesive used to adhere the elastomeric adhesive backing. Preferably, substantially enough heat is applied to at least soften, if not at least partially melt, the first adhesive film 106 when the elastomeric adhesive backing comprises the self-supporting, elastomeric adhesive layer 105 (FIG. 1). While not wanting to be bound by any theory, it is believed that embedding part of the appliqué media 3304 of the first fiber ends 103 into the first adhesive film 106 substantially adhesively bonds the media to the first adhesive film 106 by one or more of the following adhesive processes: mechanical, electrostatic, adsorption, chemisorption, diffusion, or a combination thereof. The pressure is at least sufficient to substantially mechanically interlock the elastomeric adhesive backing 201 with the appliqué media 3304, more specifically to at least sufficiently mechanically interlock the first adhesive film 106 with the appliqué media 3304. The pressure, however, should not be too high to avoid pushing the first (or second) adhesive too far into and possibly through to the other side of the appliqué media.

The method proceeds to optional step 510 in which the elastomeric adhesive backing is cut to the same final shape as the cut appliqué media. The cutting process in optional step 510 is performed to cut the elastomeric adhesive backing into the final shape to correspond to the final shape of the cut appliqué media. As described above, the cutting process may be performed using any suitable cutting device known to a person of ordinary skill within the art, such as a steel-rule dies, hard tool metal dies, laser cutter, ultrasound cutter, high frequency cutter, hot-wire cutter, or water jet cutter. In embodiments, the cutting process is one of laser or die cutting process. The cutting process may also include an ablation process to improve adhesion of a textile as noted above.

At optional step 512, weeding of the cut elastomeric adhesive backing is performed. The weeding process involves removing the excess elastomeric adhesive backing that is not part of the final shape. The weeding may be performed manually by a person using various tools for example a razor blade or other appropriate device for removing the excess elastomeric adhesive backing while maintaining the elastomeric adhesive backing of the final shape. In some embodiments, the weeding at step 512 may be automatically performed using a programmed machine instead of manually by a person.

Figure 16:
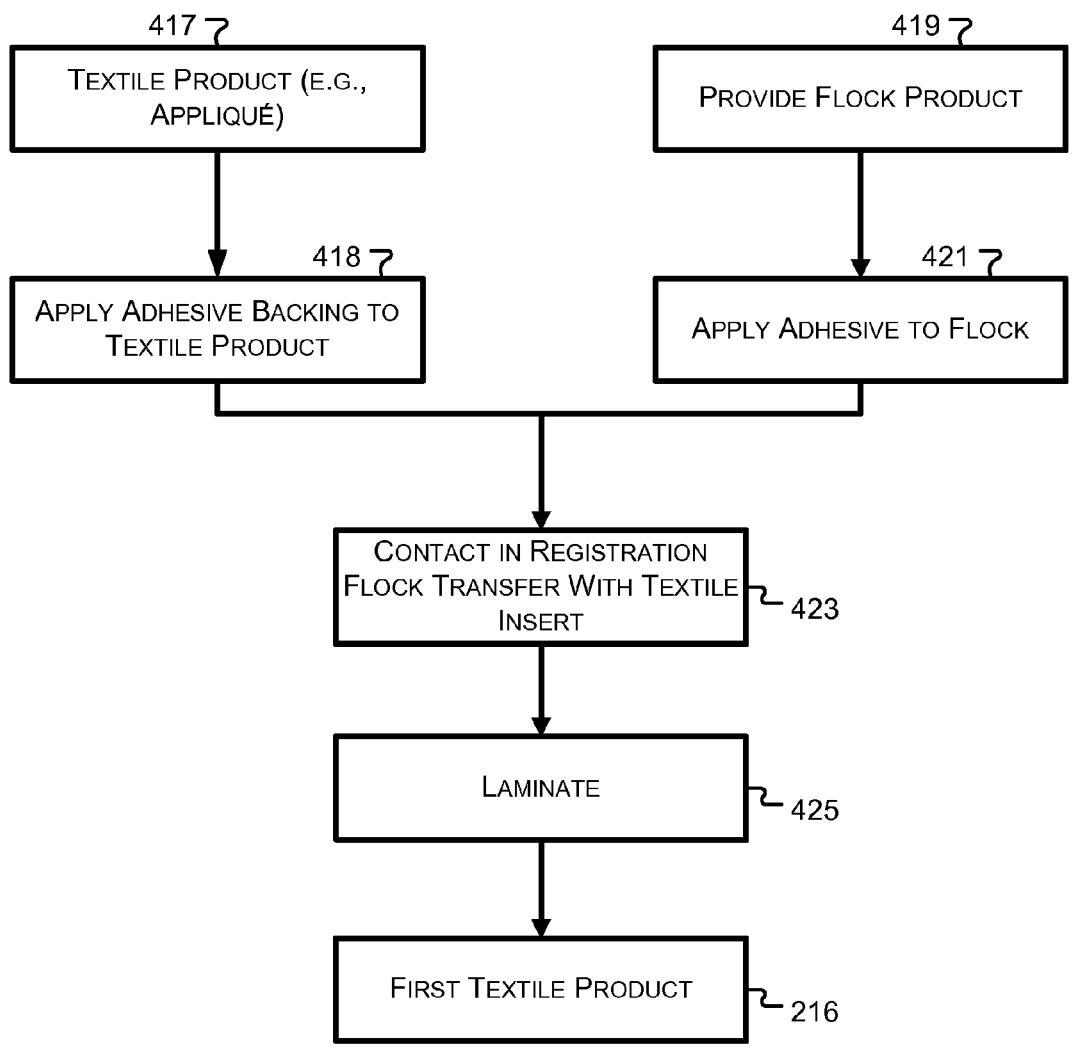
FIG. 16 depicts a process for making a textile article according to the process depicted in FIGS. 5-6.
Figure 17A:
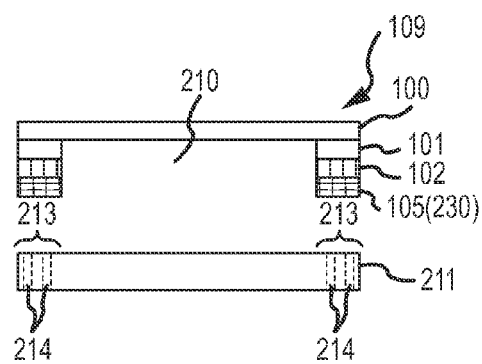
FIGS. 17A-C are cross-sectional view of textile articles made according to depict textile designs according to the process depicted in FIG. 5-6.
Figures 17B, 17C:
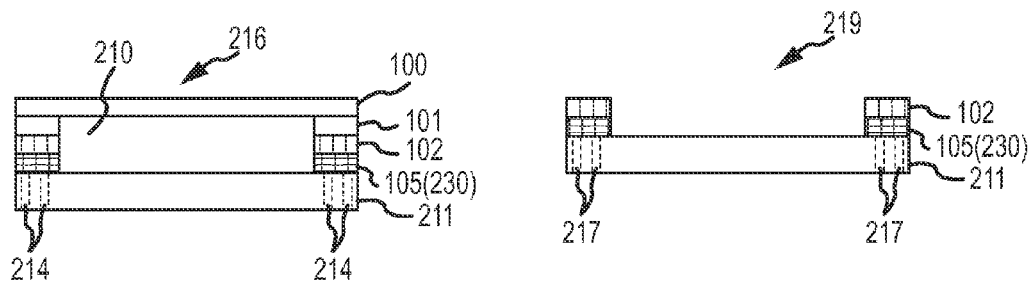

FIG. 16 depicts a process for adhering flock fibers 102 to an appliqué (such as appliqué 3300) to form the articles depicted in FIGS. 17A-C.

In step 417, a textile product such as an appliqué (e.g., appliqué 211) is supplied. At step 418, an adhesive backing is applied to the textile product provided at step 417.

In step 419, a flocked transfer sheet 161 having a void 210 is supplied. The flocked transfer sheet 161 comprises a plurality of flock fibers 102 adhered to a first carrier sheet 100 by a release adhesive 101. The flock fibers 102 have opposing first 103 and second 104 fiber ends. The first fiber ends are adhered to the first carrier sheet 100 by release adhesive 101.

Figure 18:
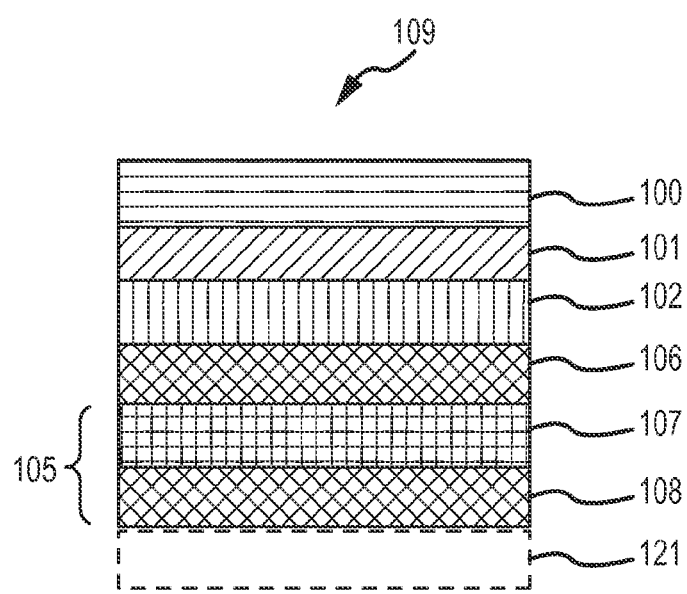
FIG. 18 is a cross-sectional view of a flocked product according to an embodiment.

In step 421, an elastomeric adhesive 230 is applied to at least most of the second fiber ends 104 to form a flocked product 109 (FIG. 18). The flocked product 109 includes first and second carrier sheets 100 and 121, release adhesive 101, flock fibers 102, and elastomeric adhesive layer 105. In a preferred embodiment, the elastomeric adhesive 230 comprises the self-supporting, elastomeric adhesive layer 105.

In another preferred embodiment, the flocked product 109 is provided in step 419. That is, step 421 may be omitted when the flocked product 109 of FIG. 18 is provided in step 419.

The elastomeric adhesive 230 may be any adhesive, preferably, a thermosetting adhesive, a thermoplastic adhesive, or a combination thereof. The adhesive may be a liquid, powder, web, or solid adhesive. When the elastomeric adhesive 230 is a liquid, it may be sprayed, wet coated, or screen-printed on the free ends of the flock fibers 102. And, when the elastomeric adhesive 230 is a solid, it may be one of a powder, web, or dry self-supporting film, such as a continuous extruded film.

Preferably, the elastomeric adhesive 230 comprises a thermoplastic adhesive. Suitable thermoplastic adhesives comprise homopolymers, copolymers or polymer alloy comprising one or more of polyolefins, polystyrenes, polyvinyls, polyacrylics, polyhaloolefins, polydienes, polyoxides, polyesters, polyacetals, polysulfides, polythioesters, polyamides, polythioamides, polyurethanes, polythiourethanes, polyureas, polythioureas, polyimides, polythioimides, polyanhydrides, polythianhydrides, polycarbonates, polythiocarbonates, polyimines, polysiloxanes, polysilanes, polyphosphazenes, polyketones, polythioketones, polysulfones, polysulfoxides, polysulfonates, polysulfoamides, polyphylenes, and combinations and/or mixtures thereof. More specifically in a preferred embodiment, the thermoplastic composition comprises one of acrylonitrile butadiene styrene, acrylic (PMMA), celluloid, cellulose acetate, cycloolefin copolymer, ethylene-vinyl acetate (EVA), ethylene vinyl alcohol (EVOH), fluoroplastic (PTFE, FEP, PFA, CTFE, ECTFE, and/or ETFE), ionomer, liquid crystal polymer (LCP), polyacetal (POM and/or acetal), polyacrylate (acrylic), polyacrylonitrile (PAN or acrylonitrile), polyamide (PA or nylon), polyamide-imide (PAI), polyaryletherketone (PAEK and/or ketone), polybutadiene (PBD), polybutylene (PB), polybutylene terphthalate (PBT), polycaprolactone (PCL), polychlorotrifluoroethylene (PCTFE), polyethylene terephthalate (PET), polycycloheylene dimethylene terephthalate (PCT), polycarbonate (PC), polyhydroxylalkanoate (PHA), polyketone (PK), polyester, polyethylene (PE), polyetherketoneketone (PEKK), polyetherimide (PEI), polyethersulfone (PES), polysulfone, polyethlenechloriate (PEC), polyimide, polyacetic acid (PLA), polymethylpentene (PMP), polyphenylene oxide (PPO), polyphylene sulfide (PPS), polyphthalamide (PPA), polypropylen (PP), polystyrene (PS), polsulfone (PSU), polytrimethylen terphthalate (PTT), polyurethane (PU), polyvinyl acetate (PVA), polyvinyl chloride (PVC), polyvinylidene chloride (PVDC), styrene-acrylonitrile (SAN), and combinations thereof. In an even more preferred embodiment, the elastomeric adhesive 230 comprises one or more of polyurethane, polyvinyl acetate, polyamide, polyacrylate and combinations thereof. In a more preferred embodiment, the elastomeric adhesive 230 comprises a polyurethane.

In step 423, the flocked product 109 and the appliqué 211 (supplied in step 417) are contacted in registration. That is, one of the self-supporting, elastomeric adhesive layer 105 and elastomeric adhesive 230 is contacted with registration area 213 of the textile product 211 (FIG. 17A). Additionally, the void 210 is in registration with at least most, if not all, of the design image 215 of the appliqué 211.

It is appreciated that the void 210, either the appliqué 211, or both are configured and/or sized, such that the appliqué 211 and void 210 substantially match to properly display the appliqué 211, when placed adjacent to the void 210. It can be further appreciated that, in one configuration, the void 210 and/or the design image 215 substantially match in size and shape to properly display the appliqué 211 and/or design image 215 when placed adjacent to the void 210. In another configuration, the design image 215 or appliqué 211 is slightly larger than the void 210. In this configuration, the width and height dimensions of the design image 215 are preferably at least about 2 mm, and even more preferably at least about 4 mm larger than the same respective dimensions of the void.

Preferably, the registration area 213 has been prepared to accept one of the adhesives 105 or 230. Prepared to accept one of the adhesives 105 and 230 means at least some, if not most, of the registration area 213 has be treated to substantially promote and/or enhance adhesive bonding of the appliqué 211 with one of the self-supporting, elastomeric adhesive 105 and elastomeric adhesive 230 being contacted with the appliqué 211. In one configuration, the appliqué 211 may be ablated, mechanically, chemically, or thermally treated to improve adhesive bonding. While not wanting to be limited by example, the registration area 213 has been prepared by forming a plurality of holes 214 within the registration area 213.

In step 425, the elastomeric adhesive 230 is thermally bonded to the appliqué 211 to form a first textile product 216 (FIG. 17B). During the lamination step 425, the elastomeric adhesive 230 is softened and/or partly liquefied and under the application of heat and pressure flows into the plurality of holes 214 filling the plurality of holes with the elastomeric adhesive 230 (shown in FIG. 17B as 217). It can be appreciated that, the textile 203 may be removed in selected areas of the contact area 629. While not wanting to be bound by any theory, it is believed that the elastomeric adhesive 230 within the plurality of holes 214 substantially adhesively bonds with the appliqué 211 by one or more of: mechanical, electrostatic, adsorption, chemisorption, diffusion, or a combination thereof. Preferably, the adhesive interaction of the elastomeric adhesive 230 with the appliqué 211 is at least some, if not mostly, mechanical in nature.

The carrier sheet 100 with release adhesive 101 may be removed from the first textile product 216 to form a second textile product 219. In one configuration, the elastomeric adhesive 230 holding the transfer to the adjacent face of the insert 417 (FIGS. 17A-17C) provides a substantially satisfactory bond (at least about 10 pounds measured by a lab peel test), primarily by securing a mechanical grip on the insert's surface.

In one configuration, the first or second textile products are cut, such as by a laser, to provide the final overall outer shape of the product.

Other embodiments of this process are discussed in U.S. Pat. Nos. 5,207,851; 5,346,746; and 6,110,560; and U.S. patent application Ser. Nos. 11/460,519 and 12/397,946, each of which is incorporated herein by this reference.

Figure 19:
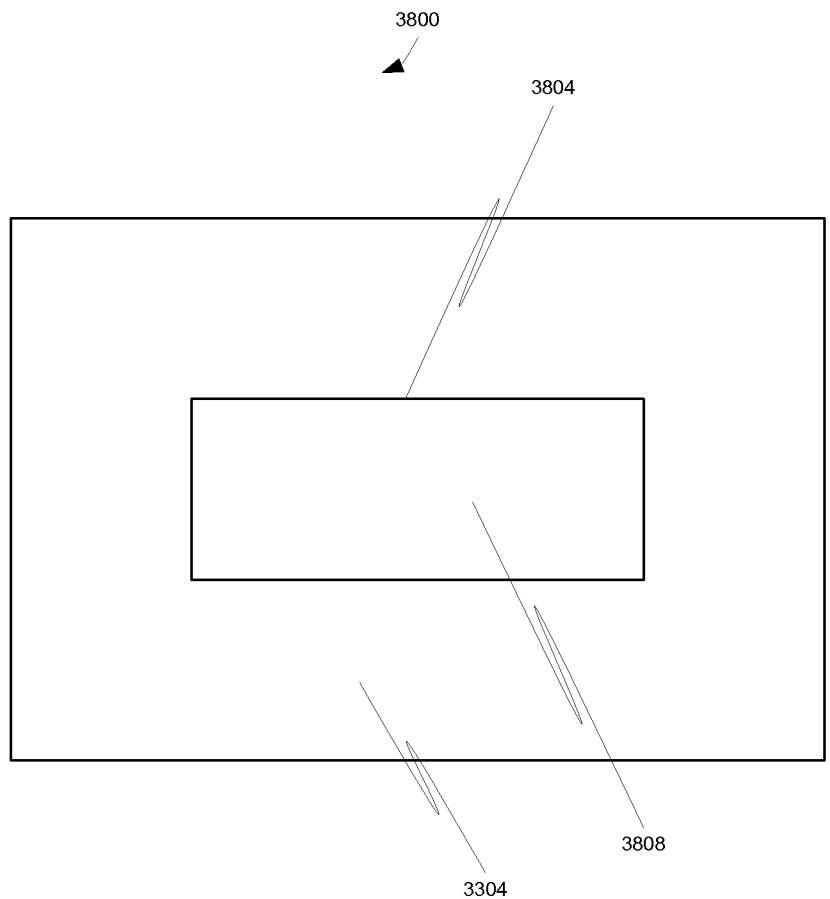
FIG. 19 depicts a textile product according to an embodiment.

As will be appreciated, the steps of FIG. 16 can be modified to produce a textile product 3800 of FIG. 19. In the textile product 3800, an appliqué media 3304, which is preferably an unflocked textile, has a void 3804 into which is positioned a flock insert 3808. The appliqué media 3304 and flock insert 3808 are both mounted on the elastomeric adhesive layer 105. The textile product 3800 is manufactured by the steps of FIG.

16 with the appliqué media 3304 being substituted for the flocked product 109 and the flocked product 109 being substituted for the appliqué 211 or appliqué 3300.

Molded Articles

Figure 20:
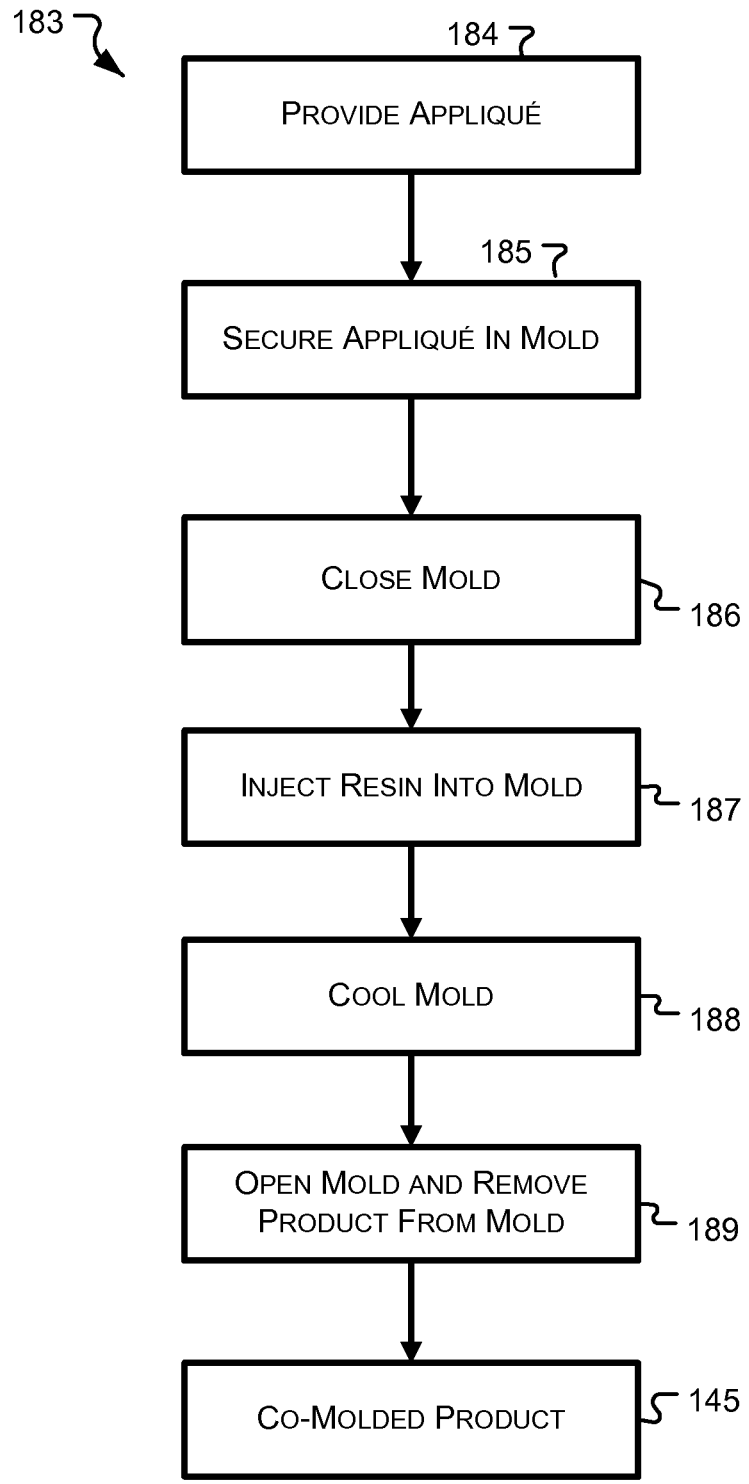
FIG. 20 depicts a molding process for making a molded product according to an embodiment of the present disclosure.
Figure 21:
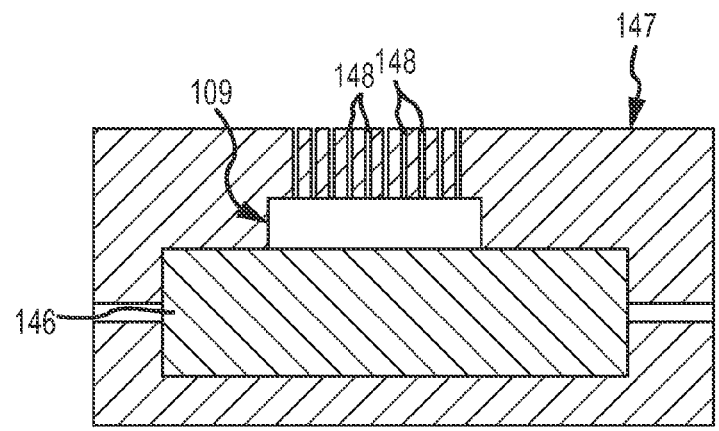
FIG. 21 is a cross-sectional view of a mold and molded product according to the process depicted in FIG. 20.

Another aspect of the present disclosure is depicted in FIGS. 20, 21, 22 and 23. FIG. 20 depicts a process 183 for a co-molded product 145 having a appliqué 3300. The appliqué 3300 (without the release adhesive and carrier sheet) is provided for in step 184 and mounted in a mold 147 in step 185. It can be appreciated that the appliqué 3300 (without the release adhesive and carrier sheet) can include one or multiple appliqué media as discussed above can be provided and mount in the mold 147 in step 185. FIG. 21 depicts a configuration where the appliqué 3300 (without the release adhesive and carrier sheet) is on top of molded article 146. In another configuration, depicted in FIG. 22, the appliqué 3300 (without the release adhesive and carrier sheet) is embedded in the molded article 146. The appliqué 3300 (without the release adhesive and carrier sheet) may be cut and/or fabricated to fit within the mold 147. In one configuration, the appliqué 3300 (without the release adhesive and carrier sheet) has an optional backing material 149.

The appliqué 3300 (without the release adhesive and carrier sheet) is secured in step 185 within the mold 147 by any means, such as, but not limited to, a temporary or release adhesive, or by the use of a vacuum. The mold 147 is depicted with vacuum holes 148 passing through the mold body, the vacuum holes 148 are in contact with the appliqué 3300 (without the release adhesive and carrier sheet). A vacuum may be drawn through the vacuum holes 148 to hold the appliqué 3300 (without the release adhesive and carrier sheet) in place within the mold 147.

In another configuration, a low-pressure resin injection may be used secure the flocked product 109 and/or appliqué 3300 (without the release adhesive and carrier sheet) in position; after securing the flocked product 109 and/or appliqué 3300 (without the release adhesive and carrier sheet), a second full-pressure injection is made.

Figure 22:
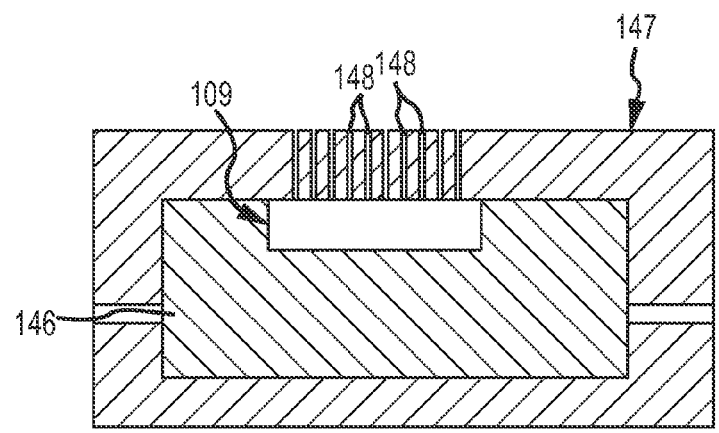
FIG. 22 is a cross-sectional view of another mold and molded product according to the process depicted in FIG. 20.

In another configuration, the mold 147 cavity may have a slight depression (of about 1 mm) to accommodate the appliqué 3300, such that, the appliqué 3300 is substantially flush with a surface of the molded article 146, as shown in FIG. 22.

After securing the appliqué 3300 (without the release adhesive and carrier sheet) in the mold 147, the mold 147 is closed in step 186 and a hot resin is injected into the mold 147 in step 187. The method of molding may be any molding method, such as, but not limited to, injection, reaction injection, compression, transfer, and resin transfer molding. In a particularly preferred embodiment, the method of molding is reaction injection molding, wherein two base resins are mixed together as they enter the mold 147, a chemical reaction occurs within the mold 147 to form the molded article 146. Preferably, the molded article 146 comprises an elastomeric, bendable, and/or stretchable and elastic molded article. That is, the molded article 146 substantially has elastic properties (as defined above).

In step 188, the mold 147 is cooled, after injecting the resin into the mold 147. The mold 147 may be cooled by any appropriate method known within the art. One preferred method for cooling is circulating water, either around the exterior or through the walls of the mold 147. The water may be circulated during or after the injection molding process.

As the resin cools, the resin permanently bonds with the appliqué 3300 (without the release adhesive and carrier sheet) to form the co-molded product 145. When the resin has sufficiently cooled and/or solidified the mold 147 is opened and the co-molded product 145 is removed, in step 189, from the mold 147.

Figure 23:
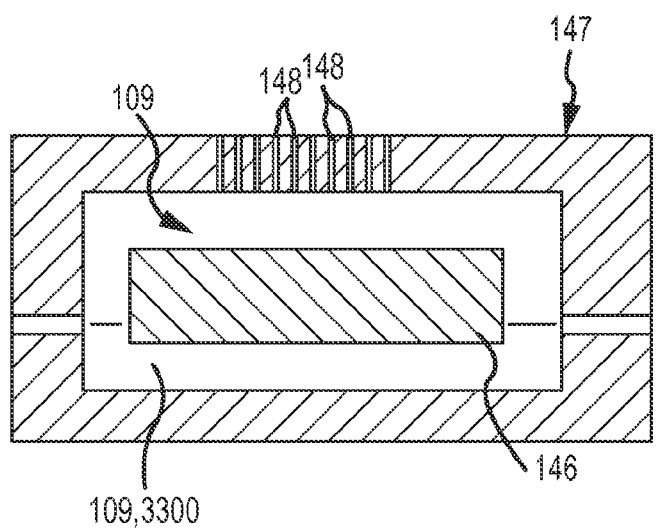
FIG. 23 is a cross-sectional view of yet another mold and molded product according to the process depicted in FIG. 20.

FIG. 23 depicts another mold 147 which may be used in the process depicted in 24 for forming a co-molded product 145. The appliqué 3300 (without the release adhesive and carrier sheet) is secured in step 185 around one of the entire perimeter and/or volume of the mold 147 by any means, such as, but not limited to, a temporary or release adhesive, or by the use of a vacuum. The mold 147 is depicted with vacuum holes 148 passing through the mold body, the vacuum holes 148 are in contact with the appliqué 3300 (without the release adhesive and carrier sheet). A vacuum may be drawn through the vacuum holes 148 to hold the appliqué 3300 (without the release adhesive and carrier sheet) in place within the mold 147. It can be appreciated that the mold need not have the vacuum holes 148, since the appliqué 3300 (without the release adhesive and carrier sheet) can be secured in mold by other methods, such as a release adhesive.

In one configuration, after securing the appliqué 3300 (without the release adhesive and carrier sheet) in the mold 147, a substantially pre-formed elastomeric article may be placed in the mold 147 and contacted with at least some of the appliqué 3300 (without the release adhesive and carrier sheet) secured in the mold. The mold 147 is closed in step 186 and one or both of heat and pressure are applied to adhesively bond the appliqué 3300 (without the release adhesive and carrier sheet) to the pre-formed elastomeric article. The mold is cooled, in step 188, if needed and the co-molded product 145 is removed from the mold 147 in step 189.

In another configuration, after securing the appliqué 3300 (without the release adhesive and carrier sheet) in the mold a hot resin is injected into the mold 147 in step 187. The method of molding may be any molding method, such as, but not limited to, injection, reaction injection, compression, transfer, and resin transfer molding. In a particularly preferred embodiment, the method of molding is reaction injection molding, wherein two base resins are mixed together as they enter the mold 147, a chemical reaction occurs within the mold 147 to form the molded article 146. Preferably, the molded article 146 comprises an elastomeric, bendable, and/or stretchable and elastic molded article. That is, the molded article 146 substantially has elastic properties (as defined above). For example, the resin portion of the molded article 146 can be an elastic material (having properties similar to or the same as those set forth above in connection with the elastomeric adhesive layer 105 and/or component films thereof). In step 188, the mold is cooled and the co-molded product 145 is removed, in step 189, from the mold 147.

The steps of the above figures may be performed in any order. While not wanting to be limited by example, steps 305 and 307 may be performed sequentially or simultaneously. Furthermore, steps 3704, 3708, and/or 3716 may be performed not only sequentially but also substantially simultaneously, that is, the heat and pressure applied during sublimation printing may be sufficient to substantially adhere the appliqué media 3304 to the first adhesive film 106.

Other Embodiments

Figure 24:
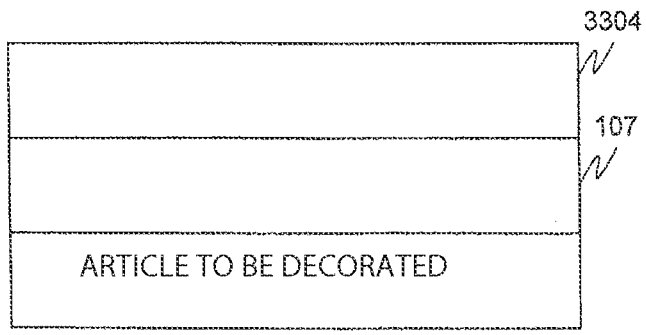
FIG. 24 depicts a textile product according to an embodiment.

In another embodiment shown in FIG. 24, the appliqué media 3304 and article to be decorated are directly contacted with the elastomeric film 107. This is effected by choosing softening and melting points and a melt viscosity for the elastomeric film 107 that will, at lamination temperatures and pressures, enable the film 107 to flow into and adhere to the appliqué media 3304 and article to be decorated. In one configuration, the elastomeric film 107 is in the form of an elastic adhesive composition including elastane. In one configuration, the elastomeric film 107 and fibers in the appliqué media 3304 have substantially the same composition. As will be appreciated, the elastomeric film 107 can be any other elastomeric adhesive having elastic properties similar to the elastic properties of the appliqué media 3304. To enable adherence of the elastomeric film 107 to an article to be decorated without adhesion of the fibers in the appliqué media 3304, the softening and melting temperatures of the elastomeric film 107 is preferably higher, more preferably 5% higher, more preferably 10% higher, and even more preferably 25% higher than the softening and melting temperatures of the appliqué media 3304. As noted, the thickness of the elastomeric film 107 is sufficient to provide a central area of the film that is substantially free of fibers, thereby providing elastic properties similar to those in the appliqué media.

Figure 25:
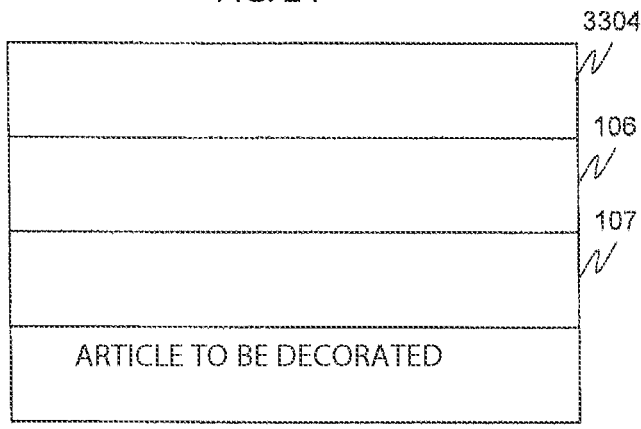
FIG. 25 depicts a textile product according to an embodiment.

In yet another embodiment shown in FIG. 25, the appliqué media 3304 is indirectly contacted with the elastomeric film 107 via the first adhesive film 106 but is directly contacted with the article to be decorated.

Figure 26:
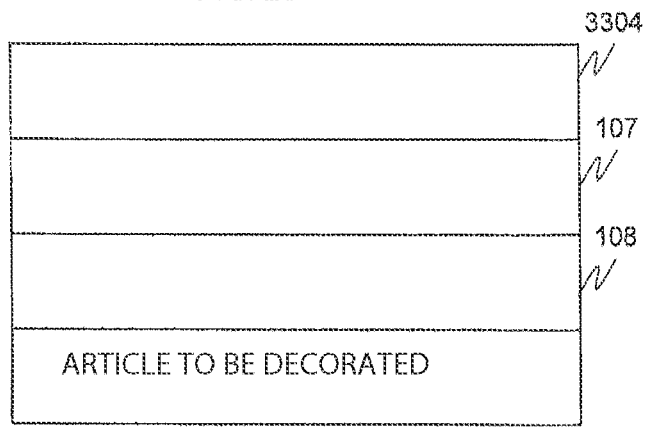
FIG. 26 depicts a textile product according to an embodiment.

In yet another embodiment shown in FIG. 26, the appliqué media 3304 is directly contacted with the elastomeric film 107, and the elastomeric film 107 is indirectly contacted with the article to be decorated via the second adhesive film 108.

In yet another embodiment, the appliqué media 3304 is not an elastic material but rather is an inelastic material having a modulus of elasticity greater than the modulus of the elastomeric adhesive layer 105 and elastomeric film 107. Typically, the appliqué media 3304 has a modulus of elasticity of more than about 11.25 pounds per foot ("lbf") (50 N), even more preferably more than about 12.50 lbf, and even more preferably more than about 15 lbf. Suitable materials for the appliqué media include any knitted and/or flocked textile, which may be pre-dyed or sublimation printed, such as those set forth herein and in the patents and patent applications incorporated herein by this reference. Although two-, three-, or more layered seam tapes can be used to attach the inelastic material to a desired article to be decorated, single layered seam tapes may also be employed.

In yet another embodiment, the appliqué media 3304 is an inelastic (or non-stretchable and inelastic) material adhered to a heat seal adhesive film (with or without the elastomeric film). The inelastic material is preferably a sublimation printed knitted, or other type of nonwoven textile. The textile is preferably polyester. After sublimation printing, the textile is contacted with a heat seal adhesive film, such as the first adhesive film, and finally cut into a design shape. To prevent the heat seal adhesive film from melting and flowing too deeply into the textile and not deeply enough into the article to be decorated when heated, the heat seal adhesive film can be selected to have a relatively high viscosity or melt flow index at the application temperature. Preferably, the adhesive film has a melt flow index of at least about 30 dg/min, even more preferably of at least about 35 dg/min, even more preferably of at least about 40 dg/min (@175° C./2.16 Kg load). Alternatively or additionally, the inelastic material can be contacted with any of the one-, two- or three-component elastomeric layers discussed above. This embodiment can produce a highly elastomeric graphic that takes advantage of the properties of stretchable and elastic textile base layers—while at the same time creating a dimensional, textured graphic which adds higher perceived value. Simply put, it is a non-stretch version of this sub dye transfer printed cut-out textile graphic that provides a new, dimensionalized graphic product. Precision cutting capability permits the appliqué media to be cut in register to the multicolor printed image, particularly by laser cutting, which can 'sinter' or weld the cut ends of the yarns to prevent fraying. The embodiment can overcome the difficulties in sublimation dye printing. It can be difficult, if not impossible, to sublimation dye transfer print at the required temperature (400° F. for approximately 1 minute) with a hotmelt adhesive backing in place on the reverse side of the textile because the hot melt may melt and flow through the face of the textile. A process embodiment of the present disclosure adds the hotmelt adhesive, after sublimation dye transfer printing, at a lower temperature. The embodiment overcomes the fundamental problem of how to have a hot melt adhesive on the back of the appliqué media. The hot melt adhesive is designed to melt and flow into the article to be decorated (garment) without flowing up in the direction of the face or sub dye transfer printed side, which flow is controlled by the use of multi-layer films and in other ways (e.g., by using one or more high viscosity films).

In yet another embodiment, the appliqué media 3304 is placed in an injection mold and the elastomeric adhesive backing 201 is contacted with an injected polymeric resin to form a molded article. The elasticity of the textile 203 and adhesive backing 201 permits the appliqué media 3304 to stretch or deform in response to the pressure of the injected resin. In other words, the elasticity of the appliqué media 3304 allows the appliqué media 3304 to conform to the geometry, shape, and size of the object to be molded, e.g., to wrap around and smoothly apply to two sides of the object. This is done by the molded article 3304 conforming to the interior of the mold, which has the reverse of the desired shape of the molded article. Aspects of the molding process are discussed in U.S. Pat. Nos. 7,338,697, 7,351,368, and 7,393,576 and copending U.S. application Ser. No. 12/013,996, filed Jan. 14, 2008, each of which is incorporated herein by this reference.

In yet another embodiment, a common carrier film and release adhesive are used to hold together multiple appliqué media that collectively form an image to be applied to an article to be decorated. In other words, the multiple appliqué media are in register relative to a selected point or area of the image. The various appliqué media, which may be flocked and/or unflocked appliqué media, may or may not be otherwise interconnected, such as by a common adhesive film.

In yet another embodiment, different types of appliqué media are combined to create new visual effects. For example, appliqué media as described herein and in copending U.S. application Ser. No. 12/031,445, filed Feb. 14, 2008, (which is incorporated herein by this reference), can be combined to create surprisingly real (to both appearance and touch) new dimensional images that look and feel like high value textures of a much more expensive textile. This illusion is created by the interplay of the real texture of unique textiles plus an "overlay" of intricate sub due transfer images printed in register to the underlying textile texture. This can create a much more dimensional texture to the design.

In another embodiment, the first adhesive film 106 is colored, such as by a dye or pigment, to a color spectrally similar to or the same as a color of the appliqué media 3300. This can be done, for example, by sublimation dye transfer both to the appliqué media 3300 and first adhesive film. This would beneficially impart a spatial coloration of the first adhesive film simultaneous with dying of the appliqué media and in a design (color) pattern similar to the appliqué media. Coloring the first adhesive film can prevent the, normally white or clear, first adhesive film from appearing between the elements of the appliqué media when the applique is stretched.

In other embodiments, the appliqué media is a woven, nonwoven or knitted textile that includes more or less light reflect yarn, which may be pre-colored (other than by sublimation printing or similar techniques noted above and below).

In other embodiments, an appliqué, (e.g., appliqué 211) may be applied to an article to be decorated that is made from a foam material. As one example, the foam material may a foamed-with-skin EVA (ethyl-vinyl-acetate). In these embodiments, the adhesive layers may be designed for adhereing the appliqué to the foam material. For example, a low melt adhesive film made of EVA and one or more additional additives may be placed in contact with the foam article. A non-compatible adhesive transfer, which may be a co-blown film including a PO (polyolefin) side and a PET (polyester) side, is then used to adhere the appliqué to the foam article. The PO side of the co-blown film is contacted with the a low melt adhesive film made of EVA, and the PET side of the co-blown film is contacted with the appliqué. Heat and/or pressure is used to adhere the layers together. It is noted that the use of a non-compatible adhesive transfer and the low melt adhesive film made of EVA may be used to adhere an appliqué media that does not include other adhesive layers as may be present in appliqué 211.

The present disclosure, in various aspects, embodiments, and configurations, includes components, methods, processes, systems and/or apparatus substantially as depicted and described herein, including various embodiments, configurations, aspects, subcombinations, and subsets thereof. Those of skill in the art will understand how to make and use the aspects, embodiments, and configurations after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the aspects, embodiments, and configurations of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/ or equivalent structures, functions, ranges or steps are disclosed herein, and without intending to publicly dedicate any patentable subject matter.

What is claimed is:

1. An article, comprising:
    an appliqué media comprising a printed design and a knitted textile;
    an elastomeric adhesive layer adhered to the appliqué media, the elastomeric adhesive layer comprising a first adhesive film and an elastomeric film, the first adhesive film being positioned between the appliqué media and the elastomeric film, wherein the appliqué media and the elastomeric adhesive layer stretch together and wherein the first adhesive film is continuously distributed over the elastomeric film.

2. The article of claim 1, wherein at least one of a modulus of elasticity and bulk modulus of the elastomeric film is less than or equal to the at least one of a modulus of elasticity and bulk modulus of the appliqué media.

3. The article of claim 1, wherein the knitted textile has a textile thickness, wherein no more than 50% of the textile thickness penetrates the first adhesive film and further comprising:
    an article to be decorated, wherein at least one of the following is true:
    (i) a modulus of elasticity of the article to be decorated is greater than a modulus of elasticity of the elastomeric film;
    (ii) a percent recovery from deformation of the elastomeric film is greater than a percent recovery from deformation of the article to be decorated;
    (iii) a tensile strength of the article to be decorated is greater than an internal recovery force and/or recovery pull strength of the elastomeric film; and
    (iv) a bulk modulus of the article to be decorated is greater than a bulk modulus of the elastomeric film.

4. The article of claim 1, wherein the elastomeric adhesive layer comprises a second adhesive film, wherein the first and second adhesive films are positioned on either side of the elastomeric film, and wherein a melt index and melting point of the first adhesive film is greater than a melt index and melting point, respectively, of the second adhesive film.

5. The article of claim 1, wherein the appliqué media comprises first and second textiles, wherein the first textile is positioned on top of the second textile, wherein each of the first and second textiles are each knitted, wherein one or both of the first and second textiles contain a printed design, wherein the printed designed is registered with the first and second textiles, wherein the first and second textiles have at least one of the following properties being different: knit patterns, knit constructions, yarn weights, stitch density, loft, hand, surface pattern, surface texture, yarn type, and yarn composition, and wherein the printed design is a sublimation printed design.

6. The article of claim 3, wherein the appliqué media and article to be decorated each comprise elastane.

7. The article of claim 1, wherein the elastomeric adhesive layer comprises a second adhesive film, wherein a thickness of each of the first and second adhesive films is no more than about 5 mils, and wherein a thickness of the elastomeric film is greater than a thickness of the first and second adhesive films.

8. The article of claim 1, wherein the elastomeric adhesive layer blocks the passage of at least about 75% of visible light wavelengths.

9. The method of claim 3, wherein an elastic property of the article to be decorated is within about 25% of the same elastic property of the appliqué media and wherein the elastic property is one or more of modulus of elasticity, bulk modulus, and stiffness.

10. The article of claim 4, wherein the first and second adhesive films have a modulus of elasticity of less than about 11.25 lbf.

11. The article of claim 4, wherein the first and second adhesive films comprise thermoplastic adhesives.

12. The article of claim 4, wherein the first and second adhesive films comprise thermoplastic polyurethanes.

13. The article of claim 1, wherein the elastic film comprises an elastomeric polyurethane.

14. The article of claim 1, wherein the elastomeric film has a thickness of 2 mils or greater.

15. The article of claim 4, wherein the first and second adhesive films and the elastomeric film have moduli of elasticity within a selected percentage of one another.

16. The article of claim 15, wherein the appliqué media has a modulus of elasticity within about 25% of the moduli of elasticity of the first and second adhesive films and elastomeric film.

17. The method of claim 1, wherein appliqué media comprises a stretchable, elastic, and/or elastomeric knit.

18. An article, comprising:
an appliqué media comprising a knitted textile having a printed design;
an elastomeric adhesive layer adhered to the appliqué media, the elastomeric adhesive layer comprising:
a first adhesive film;
an elastomeric film; and
a second adhesive film, the first adhesive film being positioned between the appliqué media and the elastomeric film and the elastomeric film being positioned between the first and second adhesive films, wherein the appliqué media and the elastomeric adhesive layer stretch together and wherein the first and second adhesive films are continuously distributed over the elastomeric film.

19. The article of claim 18, wherein the appliqué media comprises a knitted textile, wherein an elongation of the appliqué media and elastomeric layer is at least about 200% and a recovery of the appliqué media and elastomeric layer, when stretched to 100% of an original length is at least about 95%.

* * * * *